United States Patent [19]

Kitchin et al.

[11] Patent Number: 5,319,702
[45] Date of Patent: Jun. 7, 1994

[54] METHOD AND APPARATUS FOR DETECTING AND RESPONDING TO HOOK FLASH EVENTS OCCURRING ON A REMOTE TELEPHONE

[75] Inventors: Dwight W. Kitchin; Terry D. Johnson, both of Littleton; Alan K. Schott, Englewood; Scott D. Passe, Denver, all of Colo.

[73] Assignee: Tele-Matic Corporation, Englewood, Colo.

[21] Appl. No.: 921,901

[22] Filed: Jul. 29, 1992

[51] Int. Cl.[5] .......................... H04M 3/20; H04M 1/66
[52] U.S. Cl. ............................. 379/189; 379/199; 379/386; 379/114; 379/145
[58] Field of Search .............. 379/189, 190, 199, 386, 379/93, 112, 114, 123, 132, 144, 145, 155, 157, 158, 159, 162, 201, 211, 286, 377, 424

[56] References Cited

U.S. PATENT DOCUMENTS

| | | | |
|---|---|---|---|
| 3,952,160 | 4/1976 | Pasternack et al. | 379/199 |
| 3,997,731 | 12/1976 | Wilmot et al. | 379/201 |
| 4,054,756 | 10/1977 | Comella et al. | 379/114 |
| 4,055,730 | 10/1977 | Stapleford et al. | 379/372 |
| 4,196,317 | 4/1980 | Bartelink | 379/424 |
| 4,319,091 | 3/1982 | Meri | 379/385 |
| 4,333,056 | 6/1982 | Cave | 330/129 |
| 4,405,833 | 9/1983 | Cave et al. | 379/418 |
| 4,445,211 | 4/1984 | Webber | 370/62 |
| 4,629,829 | 12/1986 | Puhl et al. | 379/390 |
| 4,686,699 | 8/1987 | Wilkie | 379/93 |
| 4,726,057 | 2/1988 | Doerry et al. | 379/145 |
| 4,737,982 | 4/1988 | Boratgis et al. | 379/202 |
| 4,768,227 | 8/1988 | Dively et al. | 379/155 |
| 4,850,011 | 7/1989 | Delmege et al. | 379/157 |
| 4,916,733 | 4/1990 | Smith et al. | 379/132 |
| 4,924,501 | 5/1990 | Chesseman et al. | 379/342 |
| 4,935,956 | 6/1990 | Hellwarth et al. | 379/199 |
| 4,937,856 | 6/1990 | Natarajan | 379/158 |
| 4,944,001 | 7/1990 | Kizuik et al. | 379/386 |
| 4,947,422 | 8/1990 | Smith et al. | 379/355 |
| 5,134,651 | 7/1992 | Ortiz et al. | 379/112 |
| 5,181,237 | 1/1993 | Dowden et al. | 379/212 |
| 5,218,636 | 6/1993 | Hamilton | 379/368 |

*Primary Examiner*—James L. Dwyer
*Assistant Examiner*—Daniel S. Hunter

[57] ABSTRACT

Methods and apparatus for use in conjunction with a telephone or with equipment in telecommunication with a remote telephone are disclosed. The apparatus provides an indication as to whether a remote party using the remote telephone has performed a specific act causing the generation of a hook flash-type signal which is detected by the apparatus. The apparatus includes a low pass filter for passing energy having frequencies below about 500 Hz, and energy detector for detecting a specific electrical energy pulse having been filtered by the low pass filter and having a predetermined minimum magnitude. The apparatus also includes software for cooperating with the energy detector to detect a specific event(s) occurring on the telephone line during a predetermined maximum time window following the detection of a specific pulse. The detection of the specific event(s) provides an indication as to whether the remote party has performed a specific act such as attempting to initiate a 3-way conference call.

64 Claims, 18 Drawing Sheets

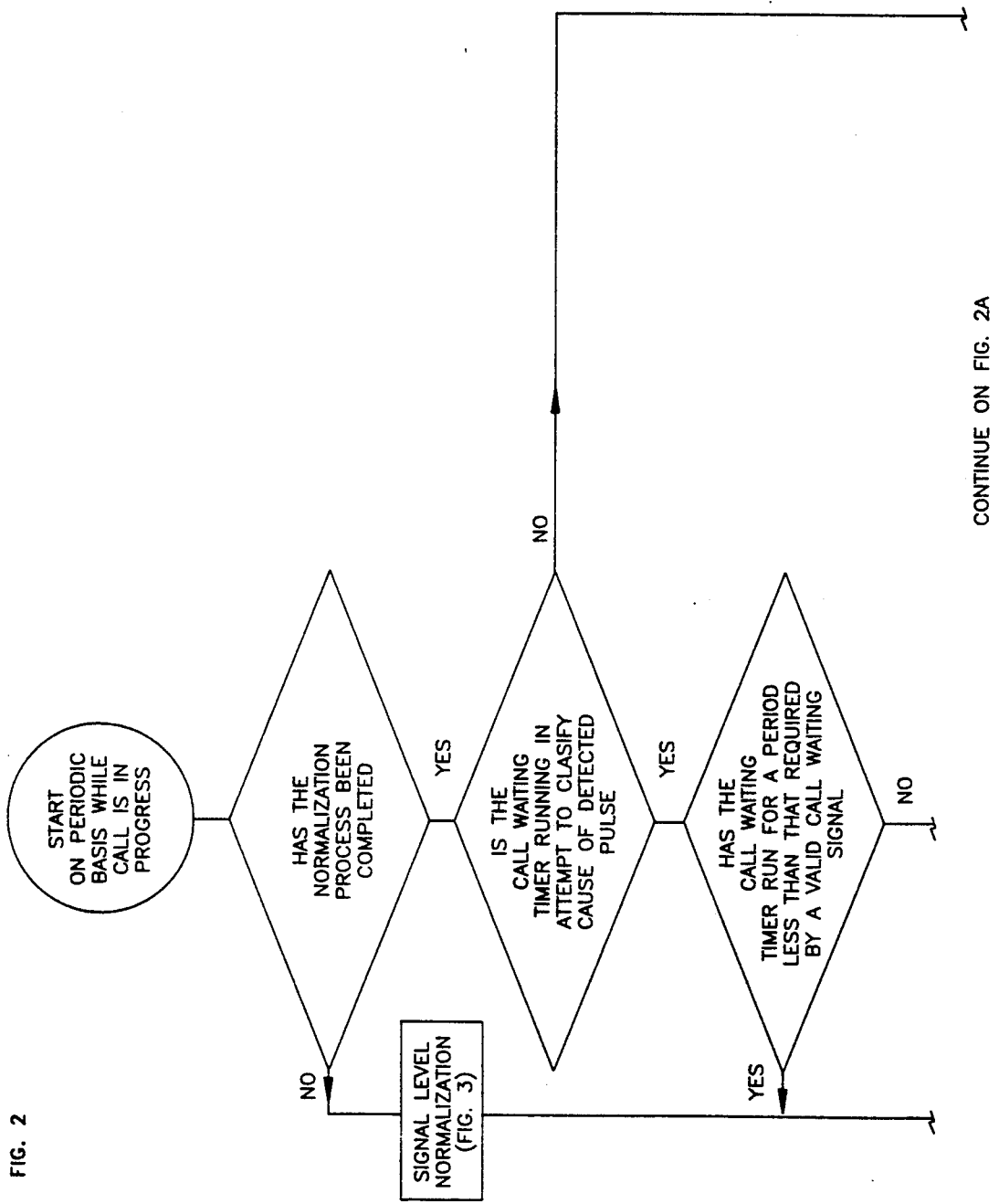

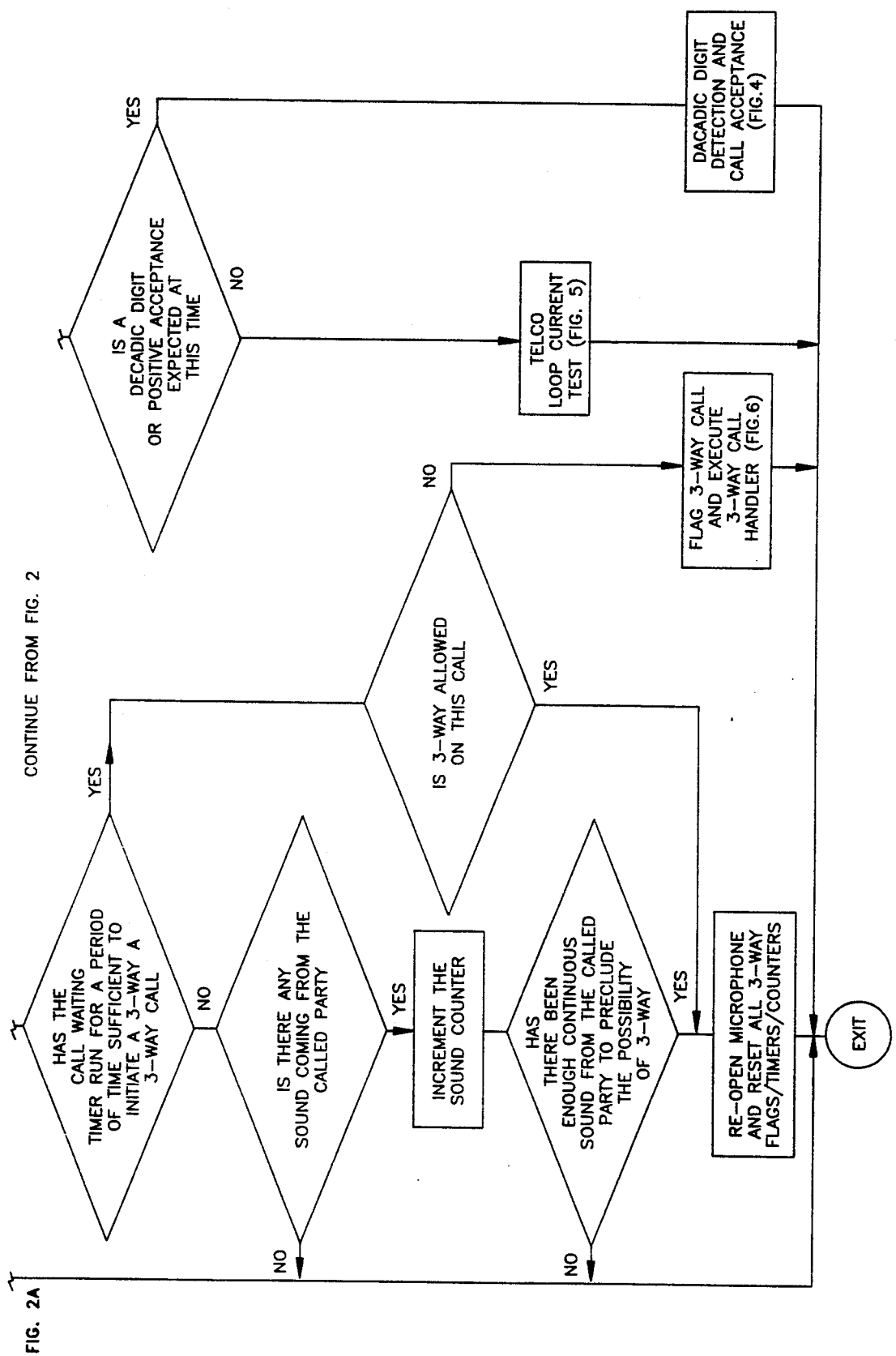

CONTINUE TO FIG. 3A

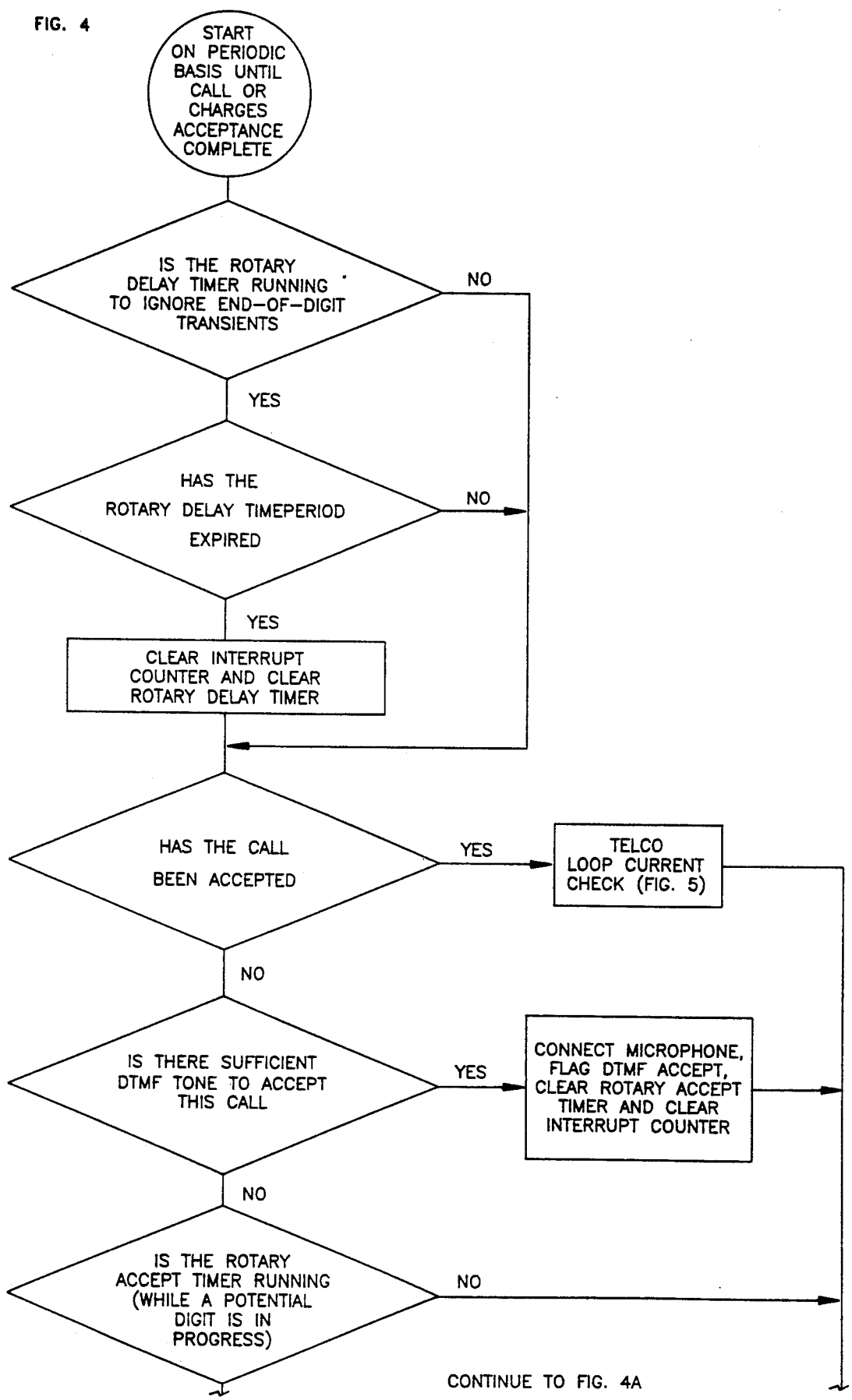

METHOD AND APPARATUS FOR DETECTING AND RESPONDING TO HOOK FLASH EVENTS OCCURRING ON A REMOTE TELEPHONE

TECHNICAL FIELD OF INVENTION

This invention relates to pulse-dial and hook-flash detection apparatus for use with computer controlled telephones. The apparatus is capable of detecting when a called party has opened the telephone circuit by dialing a digit with a pulse-dial phone or by flashing (momentarily depressing) the hook switch of either a pulse-dial or tone-dial telephone or by depressing the hook-switch which occurs when one hangs up the telephone by placing the handset of the telephone back on its hookswitch. In a similar manner, this invention provides users of pulse dialing telephones with the capability of communicating with equipment connected to the Public Switched Network (PSN) in a manner similar to that available to users to Touch-Tone (DTMF) dialing telephones.

BACKGROUND OF INVENTION

Prior to a June, 1984 FCC decision, pay telephones were the exclusive province of local telephone companies. Others were precluded from the business of providing pay telephone services. Today, however, subject to state Public Utility Commission regulations, Customer Owned Coin Operated Telephone (COCOT) service is permitted. An outgrowth of COCOT service has been the private operation of institutional telephone services. As might be expected, this "privatization" of phone systems has created a number of technical challenges including the detection of a called party's response by dialing a pulse-dial telephone and, in the case of prison systems, the prevention of three-way calling.

Coin telephones owned by local telephone companies generally utilize DC signals to signal called-party-answer. This information is transmitted between telephone company central offices and then to the originating pay telephone telling it, in effect, to accept payment for the call. This information is not, however, normally communicated to conventional, i.e., regular business and residential, telephones nor has this information been available to COCOT equipment. Collect calls placed through COCOT equipment are typically handled by an Alternate Operator Service (AOS), thus providing the owner of the COCOT equipment with the ability to provide collect call service and bill users of that service for both intra- and inter-LATA calls. However, the use of an AOS for collect calls is expensive. In addition, it opens the possibility of fraudulent activity in certain instances.

In many institutions the phone calls placed by a patient/client or prison inmate are collect calls. Collect calls initiated by a patient/client must be indicated as such to the called party. In addition, calls placed by an inmate to an outside party often begin with a prerecorded message stating that the call or collect call is from "a prison" and is being placed by "prisoner's name." In the above cases the called party is usually asked to dial a digit, commonly a '0', to accept the call or collect call and attendant charges. The phone system providing such service must be able to detect such acceptance both as a DTMF tone response from a touch-tone phone as well as detect the line current interruptions caused by the equivalent response on a pulse-dial telephone.

The clients/inmates in some institutions may be allowed to call only numbers on a preauthorized list in order to deter fraudulent activity. A prison phone system must be able to detect the called party flashing the hook switch in order to prevent the called party from activating three-way (conference) calling, dialing another number and then connecting the prisoner to an unauthorized phone number.

Accordingly, a need has arisen for a telecommunications system which can automate and simplify the processes currently handled by a traditional AOS. Specifically, a need has risen for a telephone station which can automatically route local and long distant calls without the intervention of an outside service or live operator, and which enables the telephone owner/service provider to charge for the completion of a call or collect call while preventing three-way calling.

SUMMARY OF THE INVENTION

The present invention addresses these needs by providing an apparatus for use in conjunction with equipment or a telephone referred to herein as "local equipment/telephone." When the local equipment/telephone is in telecommunication with a remote telephone, (i.e., when a telephone call is established therebetween), the apparatus is capable of indicating whether the remote party has performed a specific act causing the generation of a hook flash-type signal which is detected by the apparatus.

The apparatus of the present invention includes a low pass filter (or filter means) for passing energy having frequencies below about 500 Hz (preferably below 300 Hz) and an energy detector (energy detection means) for detecting a specific electrical energy pulse having been filtered by i.e. passed through the low pass filter and having a predetermined minimum magnitude.

The apparatus further includes software also referred to herein as window analyzation means (or software window analyzer) which cooperates with the energy detector to detect a specific event(s) occurring on the telephone line during a predetermined maximum time window following the detection of a specific pulse on the telephone line, i.e., when a telephone call is in progress between the local party/equipment and the remote party. The detection of a specific event(s) on the line provides an indication as to whether the remote party has performed a specific act such as (1) attempting to initiate a 3-way conference call, (2) accepting a call or the charges therefor, (3) terminating a call before the local equipment/party terminates the call, and (4) dialing a specific number on a remote rotary/pulse telephone.

The invention is particularly suitable for use in a computer controlled telephone wherein the energy detector detects when a called party has answered a call initiated by the computer operated telephone and dialed a pulse/dial telephone or activated (flashed) the hook-switch. The energy detector does this by measuring incoming electrical signal energy in the frequency band of less than 500 Hz, preferably between about 100 to 300 Hz. The software window analyzer cooperates with the energy detector to provide efficient and reliable protection of a called party's pulse dialing of a digit (usually a "zero") to verify the called party's acceptance of a call or a collect call or the called party's attempt to activate 3-way calling by flashing the called party's telephone hookswitch. The apparatus further includes means for preventing the calling party's signal energy from interfering with such detection which is accomplished by lower limiting the calling party's transmitting bandwidth to about 300 Hz with a high pass filter (HPF). In addition, an adjustable gain amplifier is optionally provided to compensate for expected line losses of signal energy in the 100 to 300 Hz band of frequency used by the energy detector circuit. The gain of the adjustable amplifier is set by a telephone controller at the time the call is placed. The gain is set lower for local calls and higher for long distance calls. The gain must be set higher for long distance calls since long distance calls usually pass through more amplification stages which may selectively amplify the 300 to 3,500 Hz frequency band, thereby reducing the signal in the 100 to 300 Hz frequency band.

The low pass filter (LPF) limits frequency input to an energy detector to frequencies below 300 Hz. The energy detector includes an absolute value level detector circuit that determines when an energy pulse having passed through the low pass filter is above a predetermined level. If above a predetermined level, the information is transmitted by the energy detector to the apparatus' controlling computer. As previously mentioned, the apparatus further includes software, i.e., the aforementioned window analyzer for cooperating with the energy detector to detect specific event(s) occurring on the telephone line during a predetermined maximum time window following a detection of the specific pulse.

In the situation where the apparatus is designed or programmed to detect a remote party's attempt to initiate a 3-way conference call, the software window analyzer includes a timer or timer means for cooperating with the energy detector so that the timer begins running for a first predetermined period (about 1.4 seconds) when a specific energy pulse is detected by the energy detector. The software window analyzer also includes sound detection means for detecting sound on a telephone line and for cooperating with the timer so that the sound detection means is activated at the end of the first predetermined period for a second predetermined maximum time period (up to about 1.3 seconds). If sound is not detected during the second predetermined time period, such indicates that the remote party has attempted to initiate a 3-way conference call.

The apparatus also includes response means for implementing a predetermined response when a 3-way call is indicated. Some of the responses which can be programmed into the software include call termination, playing a prerecorded message, generating a tone which may be heard by one or more parties to the call, muting the microphone of the local telephone and recording the date and time of the remote party's attempt to initiate the 3-way call.

The apparatus further includes signal interference prevention means for preventing signals originating at the local party's telephone from interfering with signals originating at the remote party's telephone. Signal interference prevention may be provided by an echo cancellation unit or by muting the microphone of the local party's telephone when a specific pulse is detected by the energy detector. In addition, the apparatus includes means for unmuting the local party's telephone if sound is detected during the second predetermined period, the unmuting of which permits the local and remote party's to converse.

As previously mentioned, the apparatus can also be designed or programmed to indicate whether the remote party has accepted a telephone call or the charges therefor. When so designed, the software window analyzer includes a counter (counting means) for counting specific energy pulses detected by the energy detector. In addition, a timer (timer means) is provided for cooperating with the energy detector so that the timer begins running for a predetermined period (about 1.2 seconds) when the energy detector detects a specific pulse. The timer also cooperates with the counter to determine if a predetermined number of specific pulses has been counted during the predetermined time period. If the predetermined number of pulses is counted (usually a number greater than 3, preferably about 8) such indicates that the remote party has accepted the call or the charges therefor.

The apparatus for indicating call acceptance also includes signal interference prevention means such as echo cancellation means or means for muting the microphone of a local party's telephone when or before the remote party answers a call placed by the local party. Also provided is means for unmuting the local party's microphone when the predetermined number of specific pulses is counted by the counter during the predetermined period, the unmuting of which permits the local and remote party to converse.

As previously mentioned, the apparatus can also be designed for use with equipment or a telephone in telecommunication with a remote party having a rotary/pulse telephone. In this embodiment, the apparatus enables the equipment, such as an answering machine (even a VCR), to receive information from the remote party. The information is transmitted from the remote party to the equipment by dialing numbers (or equivalent letters) on the remote party's rotary/pulse telephone. This embodiment of the invention also utilizes an energy detector for detecting a specific electrical energy pulse on the telephone line having a predetermined minimum magnitude and a predetermined maximum frequency, usually about 300 Hz. The software window analyzer for this embodiment includes a timer which cooperates with the energy detector to begin running for a predetermined period of time (usually about 1.2 seconds) when a specific pulse is detected. A counter is also provided for counting specific pulses detected during the predetermined period of time. The number of pulses counted provides an indication as to which number was dialed by the remote party using a rotary/pulse telephone. For example, if three specific pulses were detected during the predetermined period of time, this would indicate that the remote party dialed the number 3. This embodiment of the invention also includes transmitting means for transmitting the indicated dialed number to the equipment/telephone prompting the remote party for such information. Those skilled in the art will appreciate that this embodiment of the invention provides users of rotary/pulse dialing telephones with the capability of communicating with equipment connected to the public switch network (PSN) in a manner similar to that available to users of touch-tone (DTMF) dialing telephones.

The apparatus can also be programmed to detect the situation where the remote party terminates a telephone call before the local party/equipment terminates the call. It is important for many pay telephone systems to have this capability which is sometimes referred to as "End-of-Call-Supervision." Again, this embodiment utilizes low pass filter for passing energy having frequencies below about 500 Hz and an energy detector for detecting a specific electrical energy pulse having been filtered by said filter and having a predetermined minimum magnitude. In addition, this apparatus uses software which includes a timer for cooperating with the energy detector to begin running for a first predetermined period of time (usually about 1.4 seconds) when a specific pulse is detected. In addition, the software (window analyzer) includes sound detection means for detecting sound on the telephone line and for cooperating with the timer so that the sound detector is activated at the end of the first predetermined period for a second predetermined time period, preferably about 10 seconds. If sound is not detected during the second predetermined time period such provides an indication that the remote party has terminated the call before the local party or calling party has terminated the call. Where call termination is indicated, the apparatus will terminate the call and, if desired, the apparatus can be programmed to record the time and date of the call termination so that the party being charged for the call will be accurately charged, i.e., charged only for the actual length of the call. If sound is detected during the second predetermined period, this indicates that the remote party has not terminated the call. In this situation, the call is continued, thereby permitting the local and remote party to converse. This embodiment of the invention also includes signal interference prevention means which mutes the microphone of the local party when a specific pulse is detected. In addition, means are provided for unmuting the microphone of the local party's telephone if sound is detected by the sound detector during the second predetermined time period. As previously mentioned, the call is continued if sound is detected during the second predetermined period. Echo cancellation as previously discussed can also be used to prevent signal interference.

The present invention also provides an apparatus for use on a calling (local) party's telephone to detect a called (remote) party's answering of a call. This embodiment also includes signal interference prevention means for preventing signals originating at the calling party's telephone from interfering with signals originating at the called party's telephone. Again, signal interference can be prevented by muting the calling party's microphone or with echo cancellation. In addition, a ringback detector (ringback detection means) is provided for detecting the called party's ringback signal energy level. Also provided is a low pass filter for passing energy having frequencies below about 500 Hz and energy detection means for detecting a specific electrical energy pulse having been filtered by said filter means and having a predetermined minimum magnitude which is caused when a called (remote) party goes off-hook, i.e., removes the telephone's handset from the telephone's hookswitch. In addition, this apparatus includes means for activating the energy detector when the ringback signal is detected.

Those skilled in the art will appreciate that called party answer is indicated when the first specific energy pulse is detected after the apparatus has detected the called party's ringback signal. If the signal interference prevention means includes calling party microphone muting means, means for unmuting the microphone of the calling party's telephone must be provided when a specific pulse is detected so that the calling part may converse with the called party. This embodiment of the invention is useful where the calling party telephone is a pay telephone of a type wherein charges are based upon the length of the call. This apparatus can be used in conjunction with the previously described end-of-call-supervision apparatus, to provide an accurate way of determining the length of a telephone call for billing purposes.

Those skilled in the art will appreciate that while the present invention has been described as being useful for detecting five specific events, i.e., call answer, an attempt to initiate a 3-way conference call, call acceptance, call termination, and determining the specific number dialed number on a rotary/pulse telephone, any event which causes the generation of the hook flash-type signal such as a call waiting signal can also be detected. Accordingly, the detection of such other events is considered to be within the scope of the present invention.

BRIEF DESCRIPTION OF THE DRAWINGS

A more complete understanding of the present invention may be derived by referring to the detailed description and claims when considered in connection with the accompanying drawings in which like reference numbers indicate like features throughout the drawings, and wherein:

FIGS. 2 and 2A are a software flow diagram of the present invention for implementing a signal classification algorithm.

FIGS. 4 and 4A are a software flow diagram of the present invention for recognizing call acceptance or collect call and charges acceptance when the called party is using a pulse dialing telephone.

DETAILED DESCRIPTION OF THE INVENTION

A more complete understanding of the present invention may be derived by referring to the following detailed description and the accompanying FIGS. 1 through 13 wherein like reference numbers indicate like features throughout the drawings. In addition, reference designations for branch points in the flow diagrams and for signals contained in the schematic diagrams indicate connections which could not otherwise be adequately demonstrated due to space constraints.

The apparatus disclosed may be conventionally encased within a telephone set which may be modified for use as a public access telephone, modified for use as a prison inmate telephone or embodied as a physically separate control module to which a conventional telephone instrument is connected. Throughout the description of the present invention the terms "pay telephone," "telephone," "station" or similar terms should be construed in their broadest sense. The teachings of the present invention are applicable to all publicly accessible telecommunications devices which charge for each call made whether or not the particular device has actual coin receipt capability. The aforementioned terms when used herein are intended to include all such telecommunications devices.

The apparatus disclosed may also be incorporated within numerous types of telephone or non-telephone equipment where, in addition to some other primary purpose, the ability to remotely affect the operation of that equipment by use of a decadic, i.e. rotary or pulse, dialing telephone is desired. Examples would include answering machines and services, messaging services, tele-voting or tele-selection and operationally similar systems, VCR's or other appliances, sprinkler systems, or other premises automation systems.

BLOCK DIAGRAM OF THE SYSTEM

Figure 1:
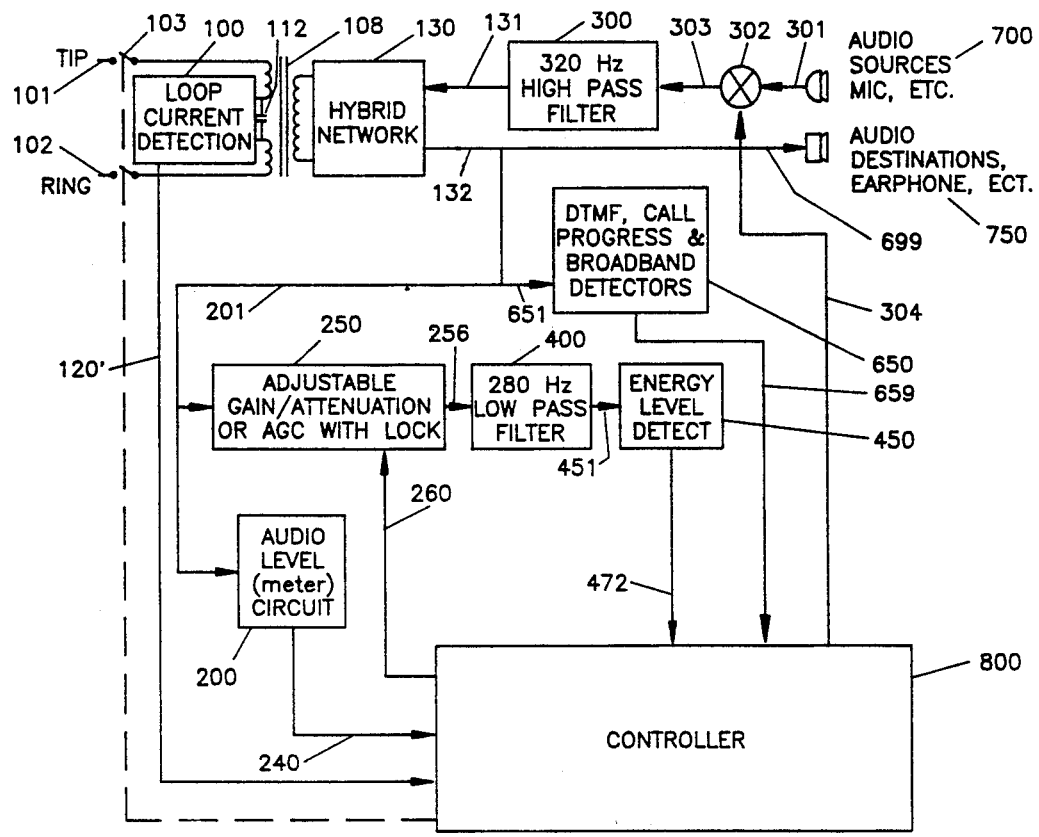
FIG. 1 is a block diagram of the pulse-dial and hook-flash detection hardware used in an embodiment of the present invention wherein hardware filters and detectors are provided.

FIG. 1 is a block diagram which shows the general organization of the pulse-dial and hook switch flash supervision architecture appropriate to implement the present invention.

Tip and Ring wires 101, 102 interconnect the disclosed telephone set with a local telephone company Central Office (CO). Relay 103 is used as the computer controlled hookswitch for the telephone.

Transformer 108 provides isolation between the telephone company lines and the present telephone set as in common practice. Capacitor 112 completes the audio signal path on the telephone company side of the transformer 108.

Block 100 provides for and limits the DC current through and voltage across the telephone company lines. Block 100 also provides the signal 120 indication of loop current in the telephone company lines 101, 102.

Network 130 is a well known hybrid circuit that provides two-wire to four-wire conversion. The present invention uses an active hybrid commonly comprised of two operational amplifiers and associated impedances. Note however that any hybrid network that amplifies its "four-wire" side audio input to a power level sufficient to drive the telephone company lines will work with the present invention. Network 130 steers received audio signals on wires 101, 102 to output line 132 for processing. It also transmits received audio to the telephone user via line 699. Network 130 also steers input signals on line 131 to lines 101, 102 for transmission to the CO. The signals on lines 131, 132 may be analog or digital depending on the hybrid used. The hybrid network 130, when used in a system with a Digital Signal Processor (DSP), commonly contains a CODEC (Coder-Decoder) to convert the analog signal received on lines 101, 102 from the CO to digital form on line 132 and the digital signal input on line 131 to analog form for transmission to the CO on lines 101, 102.

Block 300 is a High Pass Filter (HPF) section that passes frequencies above 320 Hz while attenuating signals below the pass band frequency, with significant attenuation below approximately 300 Hz. Block 300 could optionally be implemented as a Band Pass Filter (BPF) with a pass band of approximately 320 Hz to 3500 Hz. HPF block 300 filters the signal received on line 303 and drives the Hybrid Network 130 inputs on line 131. The purpose of HPF block 300 is to significantly reduce audio signals below about 300 Hz originating within the telephone set. Such signals, when echoed back from an imperfect hybrid network or telephone company network, could cause false hookflash detection signals. HPF block 300 normally has a gain of 0 Db (Gv=1). Block 300 may be implemented as a discrete or monolithic component analog/digital filter or with a Digital Signal Processor with appropriate software to implement the filter.

Block 302 is an analog switch. The function of analog switch 302 is to permit temporary interruption of the user voice, i.e., muting and unmuting, or any other, signal. Such interruption is useful while determining the source of signals detected by block 450. Signals at wire 301 are the plurality of all signals that may be created by the telephone set user or within the telephone set 700 itself. Examples of such signals are the user's voice, MODEM tones, DTMF tones, call progress tones, warning tones, recorded voice messages, etc. Analog switch 302 is controlled by the system controller 800 by line 304. When switch 302 is in its "ON" state, the signals at wire 303 are equivalent to the signals at wire 301. Switch 302 may be functionally implemented in a digital system by control of the flow of the digital representation of the original sounds.

Block 650 is representative of the frequency selective receiver/detectors normally required by computer controlled telephone sets. Such detectors include DTMF, progress tone, special progress tone, and broadband energy detectors. The broadband energy detector is required in the present invention while the frequency specific detectors and the implementation of such detectors are not specifically required. However, their illustration in the figure is helpful to an understanding of the present invention. Line 659 is shown to communicate the outputs of detectors in block 650 to the system controller 800.

Block 200 is an Audio Level Meter circuit (ALM). ALM block 200, communicates with controller 800 via lines 240 to provide an indication of the audio signal level at the telephone company terminals 101, 102. ALM block 200 normally is used to measure the level of the ringback signal generated at the called party's CO. The level of ringback signal, while not tightly controlled, is representative of the losses from the called party's CO to the originating telephone set. ALM block 200 is not required if an Adjustable Gain Amplifier 250(AGA) is not implemented for a specific application.

AGA block 250, under microprocessor control of lines 260, attenuates or amplifies the signal level from line 201 to reduce the dynamic range of the signal input to the LPF on line 256. In the illustrated embodiment, the gain of the AGA is adjustable in 0.1 db steps from −18 db to +30 db. The gain of the AGA is normally increased for long distance calls to compensate for the greater expected line losses. This range and resolution is greater than normally required. However, this is a practical solution fabricated with readily available components. Note also that the entire signal level normalization capability provided by Block 200 and Block 250 may not be required depending on the application.

Block 400 is a Low Pass Filter (LPF). LPF block 400 passes frequencies below 280 Hz while significantly attenuating signals above 300 Hz. LPF block 400 filters the signal received on line 256 and drives the absolute value detector on line 451. LPF block 400 normally has a gain of 0 Db (Gv=1). The LPF block 400 may optionally be implemented as a 100–300 Hz Band Pass Filter (BPF) or as a discrete or monolithic component analog/digital filter or with a Digital Signal Processor (DSP) with appropriate software to implement the filter.

Block 450 is an Absolute Value Amplifier (AVA) and Threshold Level Detector (TLD). AVD block 450 rectifies and amplifies the signals on line 451 to unipolar signals useful to the TLD. The TLD compares the level of the signal on line 451 with a preset level and provides a signal to the microprocessor on line 472 when the signal on 451 exceeds the preset level.

Block 800 is the Microprocessor Control Section (MCS). MCS block 800 receives the detection signals from all detectors, other telephone status signals as may be useful and provides the control signals for all the blocks above requiring control and control of the rest of the telephone. MCS block 800 may be implemented using almost any microprocessor. However, particularly suitable microprocessors include type V40 available from NEC Electronics, Inc., Mountain View, Calif.

Figure 1A:
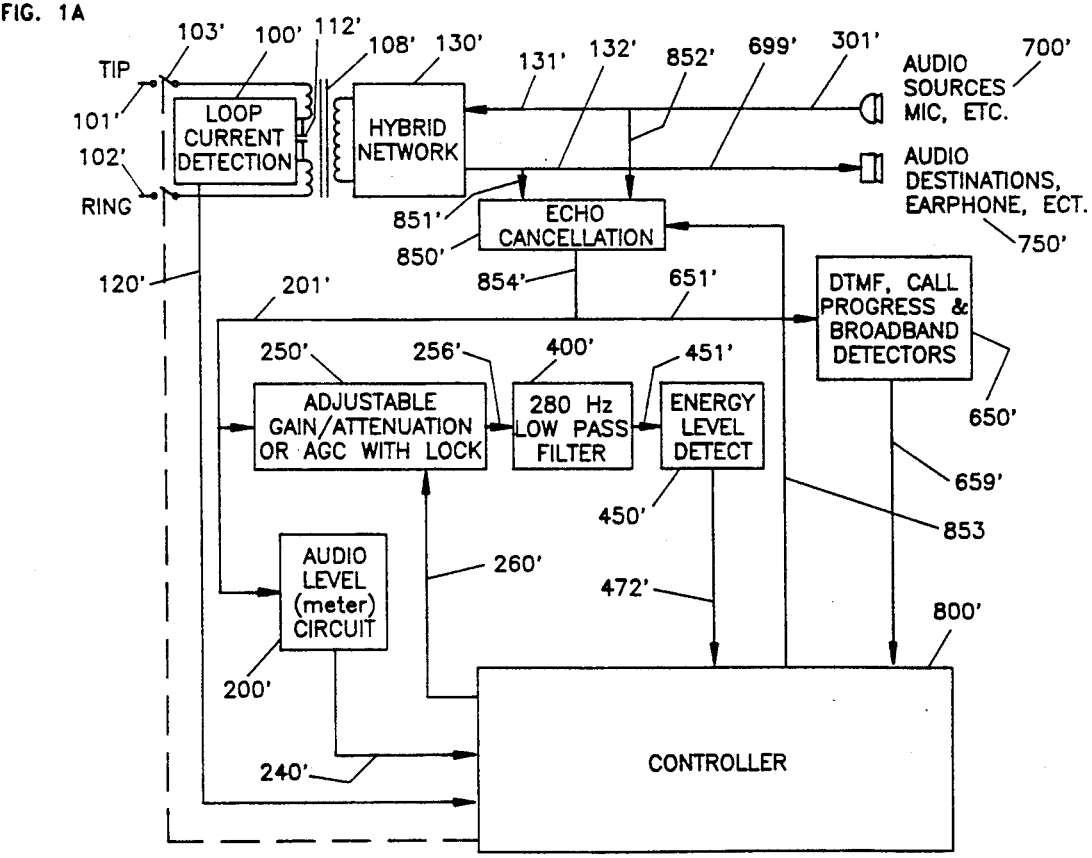
FIG. 1a is a block diagram of the pulse-dial and hook-flash detection hardware used in a second embodiment of the present invention provided with echo cancellation to prevent signal interference.

FIG. 1a is a block diagram which shows the general organization of the pulse-dial and hook switch flash supervision architecture for implementing the present invention wherein the interference with pulse signal detection by the users voice or other sounds generated within the telephone system are canceled or removed from signal 132' by an Echo Cancellation subsystem, Block 850. As this implementation does not require a HPF 300 or Audio Switch, signals 301 and 131 of FIG. 1 are identical. In this implementation, no high pass filter or muting switch is required as virtually all echoes of locally generated sound present in signal 132' are effectively subtracted from signal 132' by block 850 producing Signal 854, essentially an ideal called party audio signal. Examples of commercially available components for implementing implement Block 850 as a subsystem include the Motorola DSP56200 available from Motorola, Inc. of Schaumburg, Ill., and a pair of CODEC's available from National Semiconductor Corporation, Santa Clara, Calif.

Figure 1B:
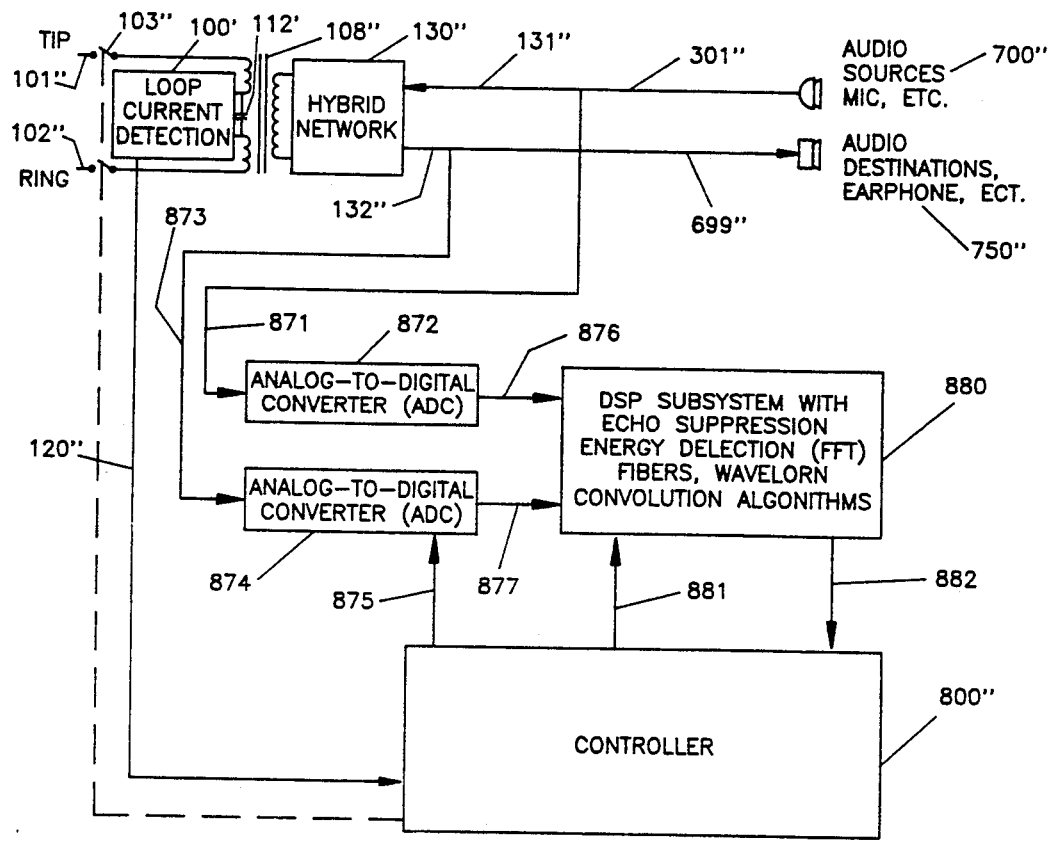
FIG. 1b is a block diagram of the pulse-dial and hook-flash detection hardware used in a third embodiment of the present invention using digital signal processing to perform portions of the process for detecting specific pulse(s) caused by a hook flash-type signal.

FIG. 1b is a block diagram showing the general organization of the pulse-dial and hook-switch flash supervision architecture for implementing the present invention wherein echo cancellation, call progress tone detection, DTMF tone detection, broadband energy detection, low pass filtering and energy threshold detection are implemented with an emphasis on digital techniques. In this implementation, audio Signal 131" is digitized for use by the Digital Signal Processing (DSP) subsystem, Block 880 and by CODEC or ADC, Block 872. If Signal 131" is in a digital form by nature of the specific implementation this step is not required. Likewise, audio Signal 132", if not in digital form by nature of the implementation, is digitized for use by the DSP subsystem, Block 880 and by CODEC or ADC, Block 874. Control Signal 875 provides the timing and synchronization required by the CODEC's. Signal 881 provides the timing, synchronization and control for the DSP subsystem while Signal 882 provides the Controller, Block 800" with signals equivalent to the Signal 659 and Signal 472. Either a Fast Fourier Transform (FFT) or sufficient filtering and level measurement technique may be implemented, for example, to also form a ratio of the level of the detected pulse to the level of the detected ringback signal. Examples of components to effectively implement Block 880 as a subsystem include the Motorola DSP56001 available from Motorola, Inc., Schaumburg, Ill., and appropriate support circuitry.

Figure 1C:
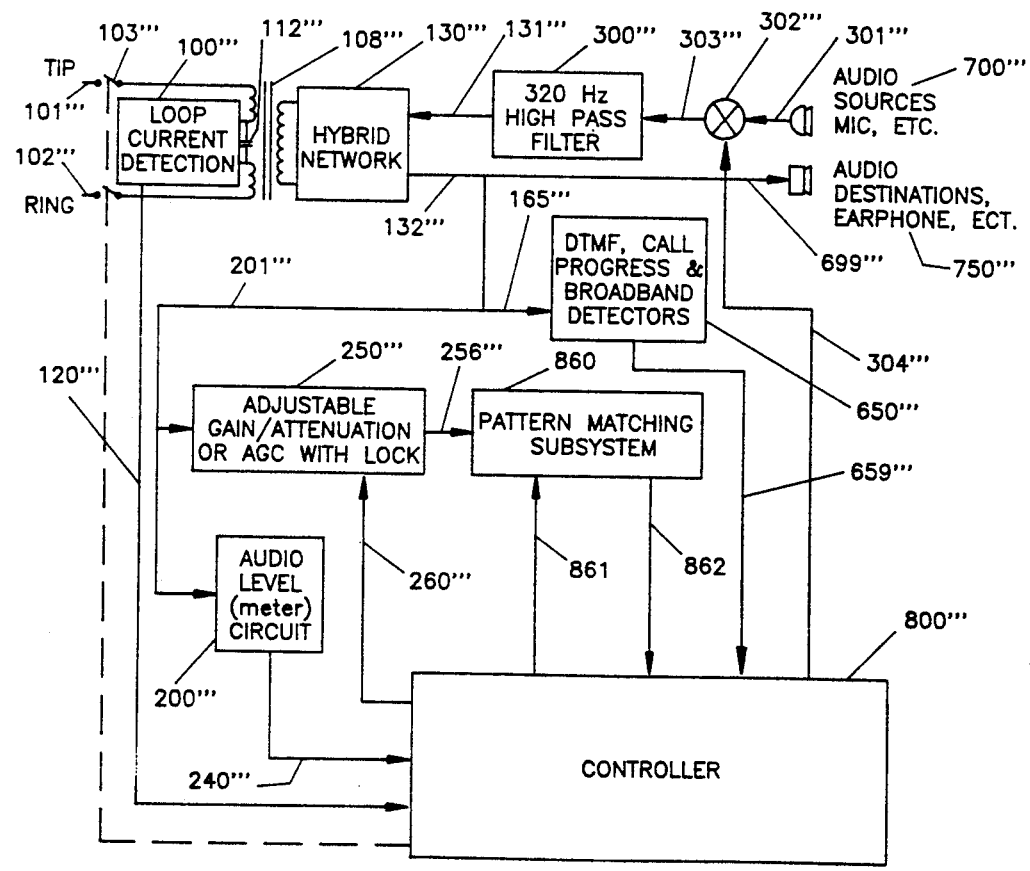
FIG. 1c is a block diagram of pulse-dial and hook-flash detection hardware used in a fourth embodiment of the present invention which utilizes a pattern matching subsystem (fuzzy or neural networks) to detect a specific pulse caused by a hook flash-type signal.

FIG. 1c is a block diagram which shows the general organization of the pulse-dial and hook switch flash supervision architecture for implementing the present invention wherein the pulse signal detection function provided by Block 400 and Block 450 is provided by a Pattern Matching or Pattern Comparator subsystem, Block 860. In this implementation, audio Signal 256''' is digitized, by a CODEC or ADC, and successive brief sample sequences are compared to a set of previously stored reference sample sequences. As a new sample sequence can be started with each new sample, the comparison process is essentially real-time. If a specific sample sequence of Signal 256''' closely matches one of the stored reference sample sequences, Signal 862 is used to inform the system controller, Block 800''' of such signal recognition.

Block 860 would, for example, perform the functions of sampling the waveform on a periodic basis, storing the samples thus acquired in RAM. The samples would then be scaled such that the highest peak signal for the particular sample series would be set to a pre-determined or maximum level for the scale used. The sample series would then be compared with a reference sample set of signals. If any of the reference signals is a close match to the sample series currently being compared, a "match" flag would be set in the controller. Examples of components for implementing Block 860 as a subsystem include the American NeuraLogix NLX110 available from American NeuraLogix, Inc., Stanford, Fla., and an ADC and appropriate support circuitry.

Note that effective combinations of portions of the above implementations of the present invention may also effectively implement the invention.

FIGS. 2–9 provide a combination of routines describing the processes needed to identify and appropriately respond to the signals and situations related to collect calls and potential fraudulent abuses of calls, collect or not, by certain classes of telephone users. The software flowcharts provided, portions thereof, or functional equivalents, would commonly be incorporated as part of a comprehensive telephone control program.

Referring to FIG. 1, the primary fraud detection/confirmation signals are 120 and 472. A plurality of secondary confirmation signals are indicated as signal 659.

Signal 120 may be activated when the calling and called telephones are served by the same wire center or in other cases where the central office serving the calling instrument provides call-progress information to the calling instrument. Under the above conditions, Signal 120 may be activated by the following conditions:

1—the serving central office switching from dialed number acceptance to line-finder operation;
2—the called party answers the telephone (goes off-hook);
3—the called party has, on a rotary (decadic) dial telephone, dialed a number (single digit);
4—the called party accidently (briefly) bumps the hookswitch during the course of a conversation;
5—the called party flashes (momentarily depresses) the hookswitch;
6—the called party has been interrupted by their serving central office with a Call-Waiting signal;
7—the called party has hung up (gone on-hook).

For the purposes of FIGS. 2-9, Signal 120 is assumed to be a polled status signal.

Signal 472 will be activated by any or all of the following conditions (in the case of a collect call either before or after call acceptance):

1—the serving central office switching from dialed number acceptance to line-finder operation;
2—the PSN transfers between carrier entities;
3—the called party answers the telephone (goes off-hook);
4—the called party has, on a rotary (decadic) dial telephone, dialed a number (single digit);
4a—note that some DTMF dialing telephones may also cause Signal 472 due to internal muting implementations in that telephone;
5—the called party has flashed (momentarily depressed) the hookswitch;
6—the called party has hung up (gone on-hook);
7—the called party has been interrupted by their serving central office with a Call-Waiting signal;
8—either the calling or called party or a transient condition within the PSN has inadvertently tripped the detector (referred to as a spurious response);
8a—the called party accidently (briefly) bumps the hookswitch during the course of a conversation.

Furthermore, the conditions above may by their nature or due to the response characteristics of potential implementations of the Low Pass Filter, Block 400, cause either or both of the following:

A) multiple, closely spaced, signals on line 472, referred to as bounce (or "ringing" filter response) or
B) multiple, delayed signals on line 472. Such delayed signals are caused by the pulse-dial contacts, hookswitch, or central office equipment returning to the state prior to the change that caused the original signal 472.

Figure 5:
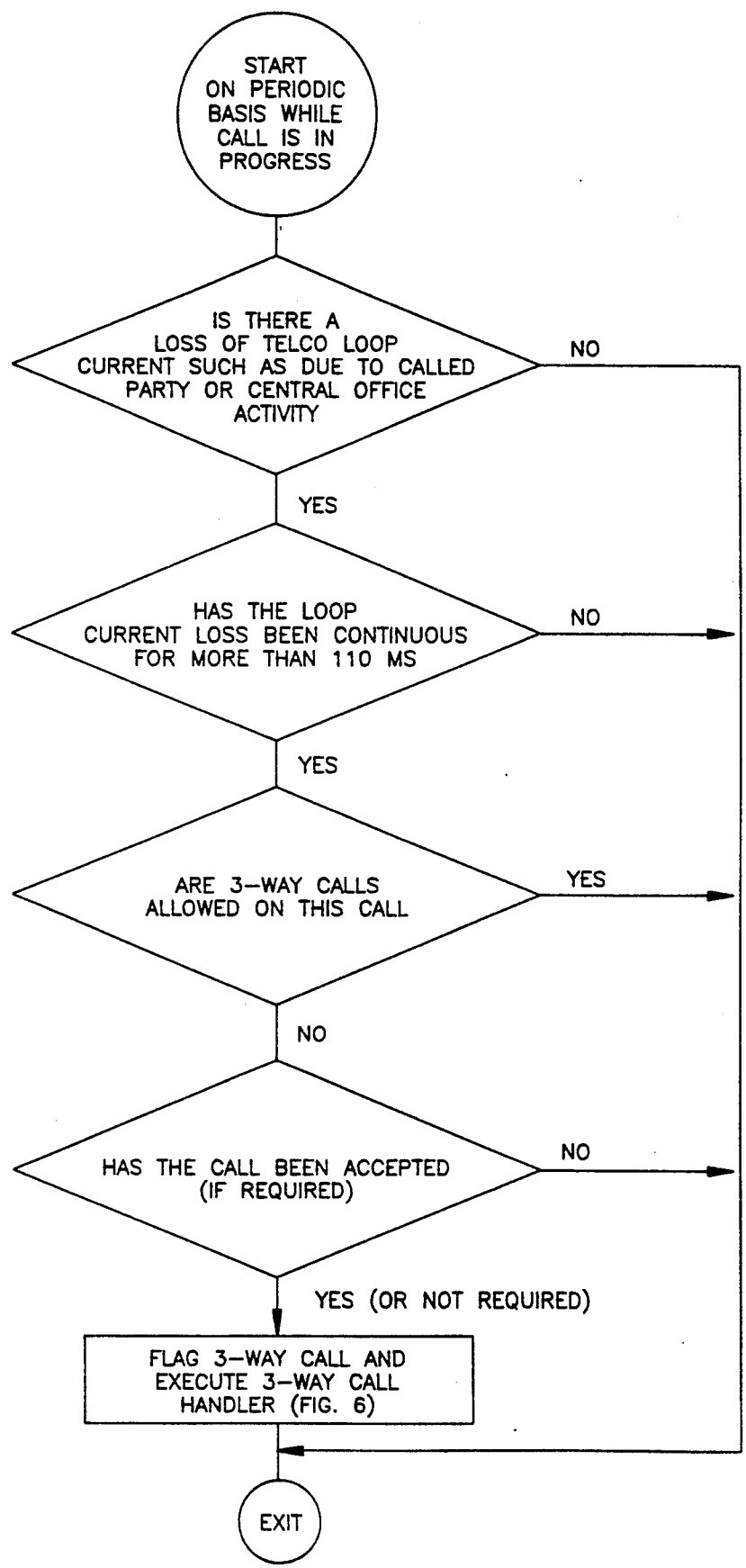
FIG. 5 is a software flow diagram of the present invention for determining if telephone company (Telco) loop current interruptions are called party hook-flash or on-hook sequences.
Figure 6:
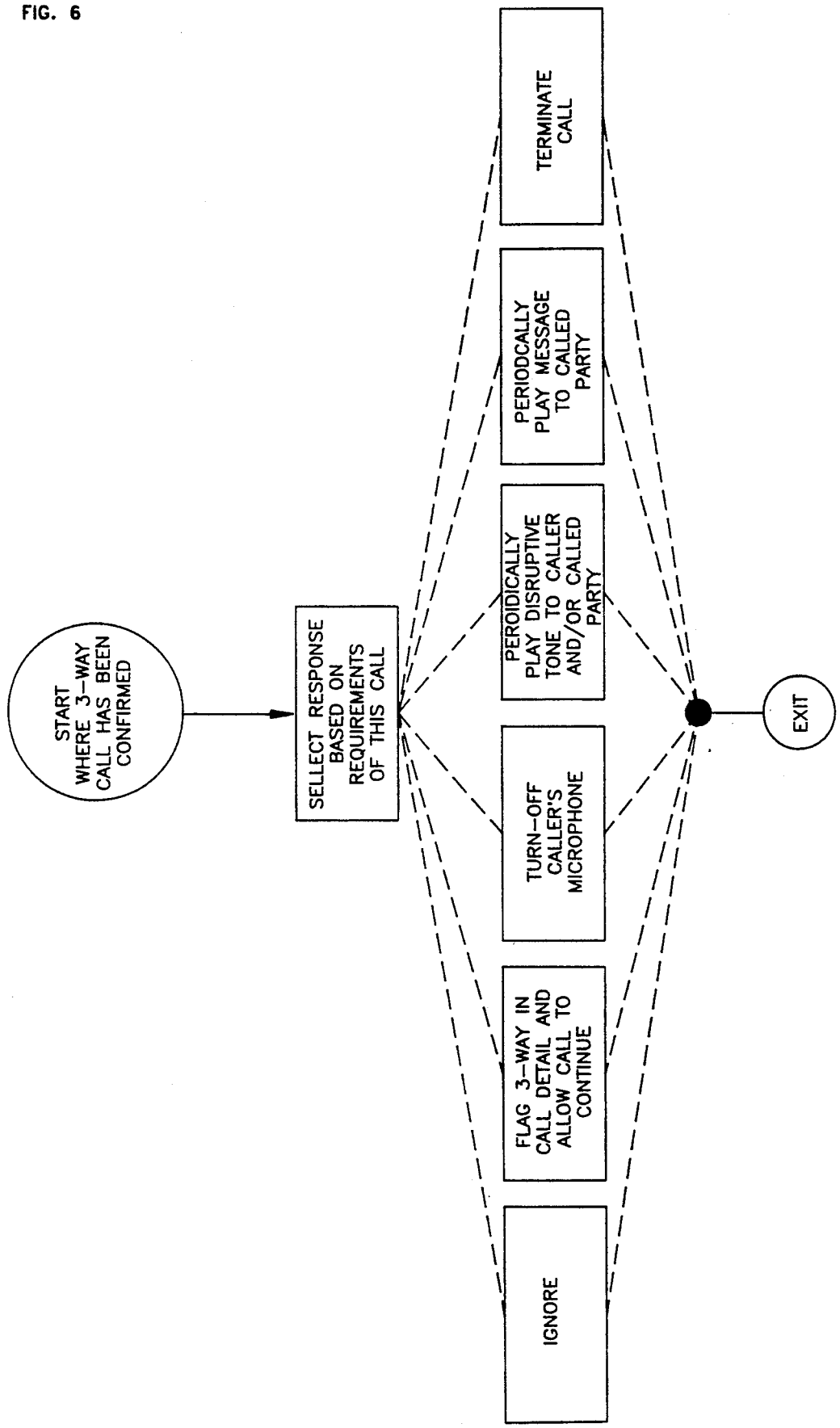
FIG. 6 is a software flow diagram of the present invention for responding to detected "three-way calls."
Figure 7:
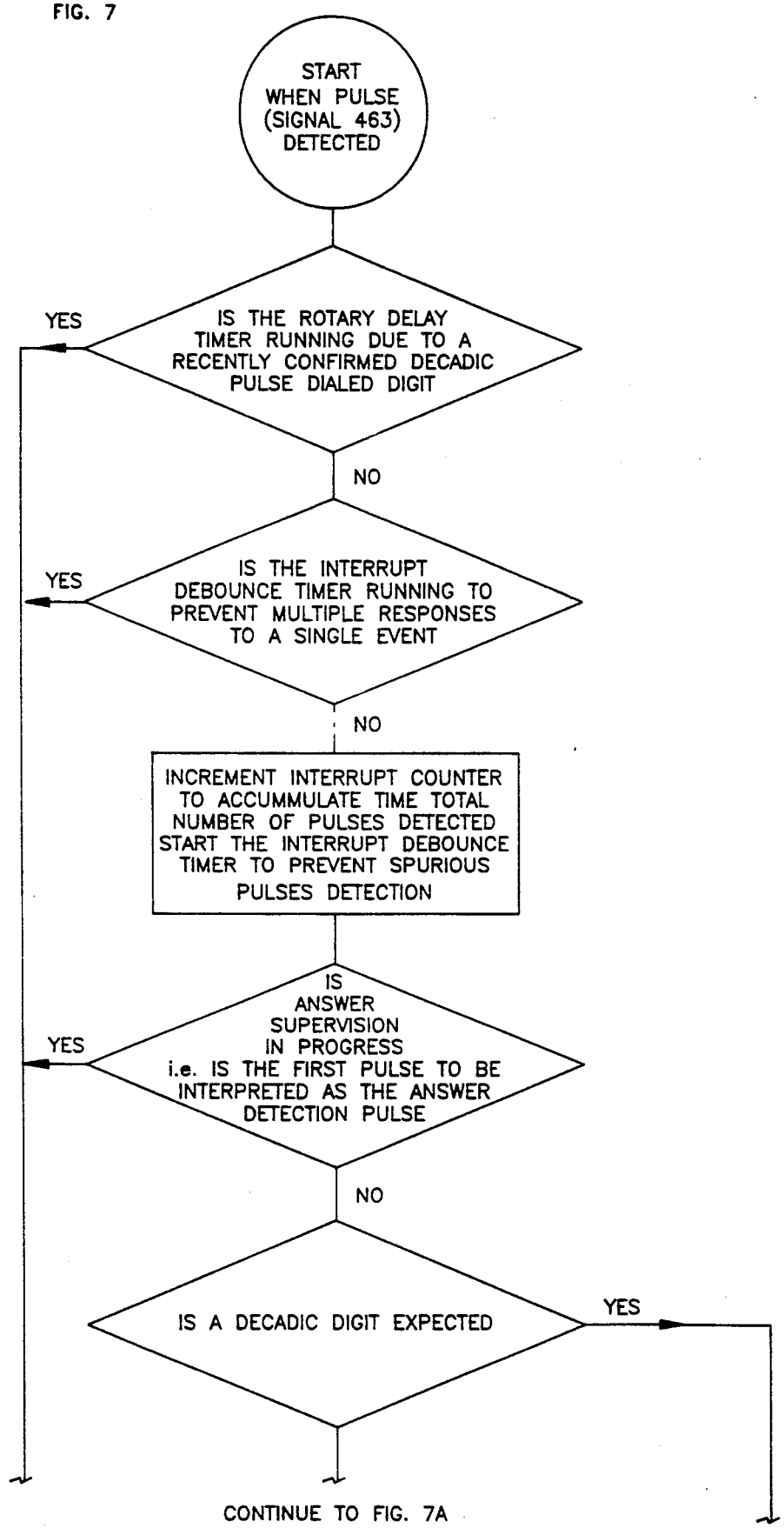
FIGS. 7 and 7A are a software flow diagram of the present invention for responding to signals possibly caused by called party pulse-dialing or hook-switch activation.

For the purposes of FIGS. 2-9, signal 472 is assumed to be an asynchronus interrupt signal that, when activated, initiates the routine provided as FIG. 7 with each such activation.

Signal 659 is a plurality of indicators commonly available in intelligent telephone systems including, but not limited to, the following:

1—precise dial-tone and ringback detection, example device is Teltone M982 available from Teltone Corporation of Kirkland, Wash.
2—other precise call-progress-tone detection, example device is Teltone M984 also available from Teltone Corporation of Kirkland, Wash.
3—DTMF signal detection, example device is Mitel MT8870 available from Mitel Corporation of Kanata, Ontario, Canada.
4—broadband energy detection, commonly about 300-750 Hz, an example device is Teltone M980 also available from Teltone Corporation.

For the purposes of FIGS. 2-9, Signals 659 are assumed to be polled status signals.

Few pulse signals detected at lines 120 or 472 can be uniquely identified at the first occurrence of that signal in isolation. An identification and control scheme similar to that presented in FIGS. 2-9 is thus provided to identify, confirm, and respond appropriately to the possible causes described above.

FIGS. 2-9 provide a combination of routines describing the processes needed to identify and appropriately respond to the signals and events related to (typically computer) controlled calls, collect calls and potential fraudulent abuses of calls, collect or not, caused by certain classes of telephone users. The software flowcharts provided, portions thereof, or functional equivalents, would commonly be incorporated as part of a comprehensive telephone control program.

The Signal Classification Algorithm, disclosed in FIGS. 2 and 2A are an example of a top level software structure that, along with structures similar to FIGS. 3-9, or relevant portions thereof, would be added to the control program for a telephone system wishing to incorporate features of the present invention. The algorithms depicted in FIGS. 2-6 and 8,9 are presented in a manner consistent with a control program based on periodic execution of its primary control algorithms. FIG. 7 is presented in a manner consistent with an interrupt to the periodic control program being initiated in response to signal 472. A suitably modified version of any or all of FIGS. 2-9 may be readily incorporated in control programs using structures other than a periodic and interrupt structure.

The algorithm described in FIGS. 2 and 2A are presented assuming a limited access telephone application which may be used in a prison inmate telephone system requiring call and/or collect call acceptance and optionally disallowing three-way conference calls. Signal level normalization to improve the performance of such a system is optionally incorporated.

The algorithm described in FIGS. 2 and 2A provides control for the functions of signal level normalization, call, or collect call, acceptance by the called party, detection of loop current loss if the called party is served by the same central office as the calling telephone system, protection against undesirable disconnection due to inadvertent system response to signals similar to those associated with three-way conference calling, and one method of detecting a three-way call initiated by the called party.

The three-way call detection algorithm presented in FIGS. 2 and 2A determines if a pulse detected by Block 450 has been caused by some occurrence other than a three-way call setup request by the called party. Causes other than a three-way call setup request have audible sounds, including voice or tone signals, detectable by Block 650. If any of these indicators are present for about 40 milliseconds or more, with 200 milliseconds virtually guarantying voice, shortly after detection of a pulse by Block 450, preferably within about 2.7 seconds, (of which about 1.4 seconds is to ignore call-waiting signals and 1.3 seconds is to accept called party sounds) the pulse was probably not caused by a three-way call attempt. For End-of-Call-Only detection where 3-way calls are not of any concern, the second period may be extended to about 10 seconds to reduce inadvertent disconnections.

Figure 3:
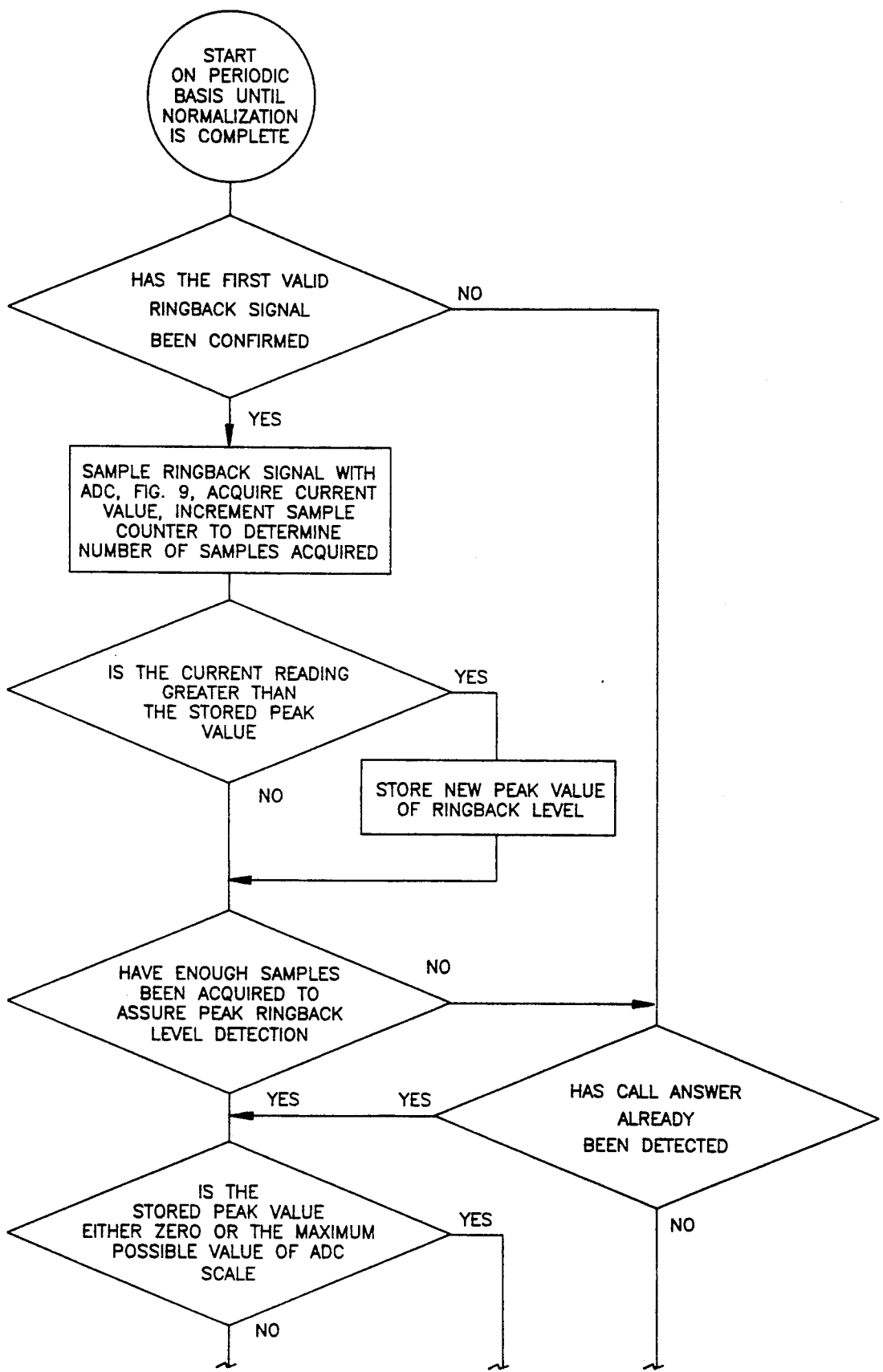
FIGS. 3 and 3A are a software flow diagram of the present invention for implementing signal level normalization.
Figures 3, 3A:
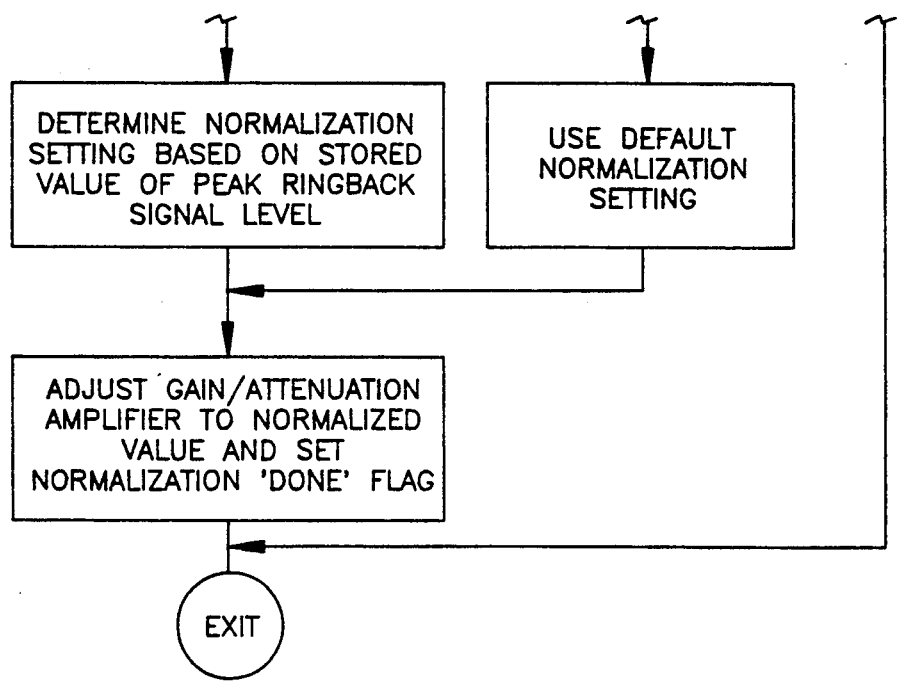

The Telco Signal Normalization Algorithm, disclosed in FIGS. 3 and 3A, is an example of one method of adjusting the system gain or attenuation of signals being presented to the detectors, the effect of which is to simplify the detection circuits and algorithms. While incorporation of a normalization function is optional, the performance of the pulse detector is distinctly improved on long distance and call forwarded calls when normalized signals are provided.

The algorithm of FIGS. 3 and 3A describes one method of finding the level of the ringback signal provided by the called party's serving central office. In most cases the level of this signal is conveniently related to the nature of the path and the attendant signal loss associated with each call. Having determined the level of the ringback signal, over which the called party has virtually no control, an appropriate gain adjustment is made to provide a consistent pulse detection environment for the following, i.e., downstream circuits.

Figure 4A:
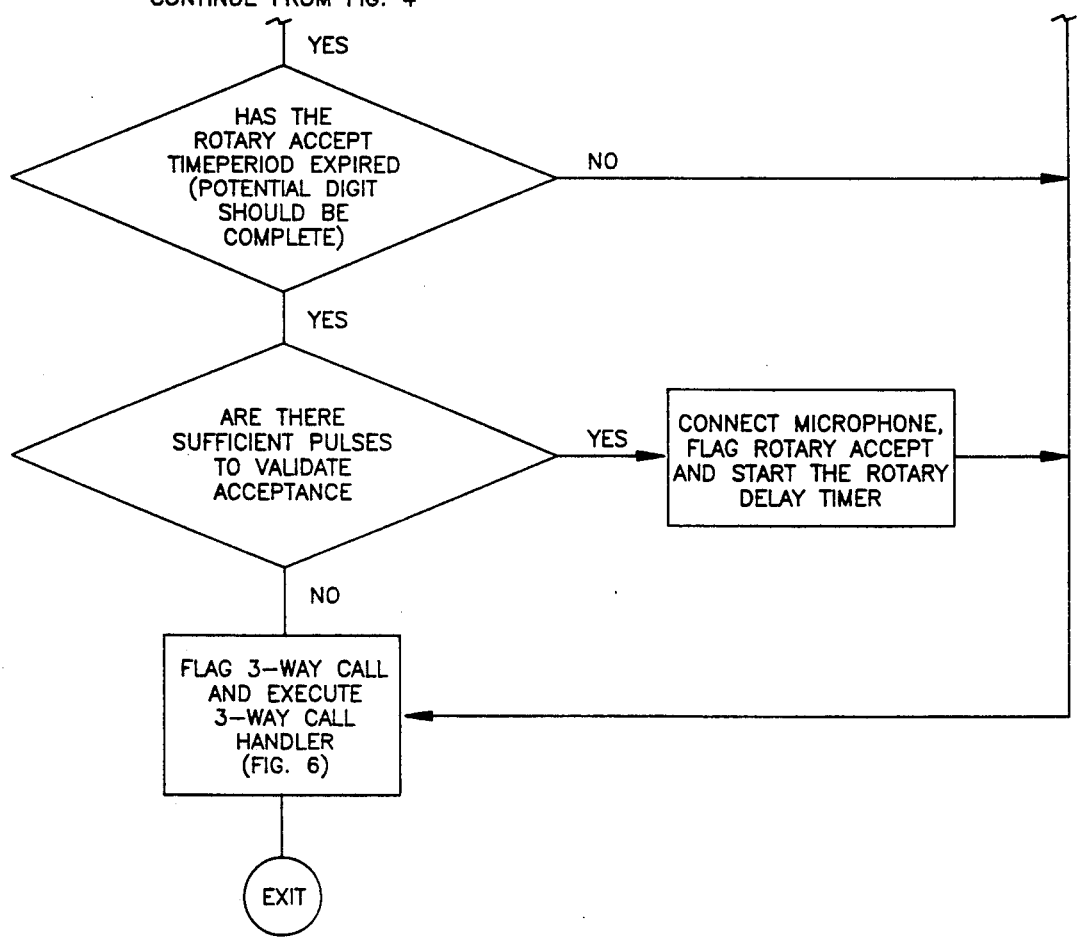

The Call Acceptance Algorithm, disclosed in FIGS. 4 and 4A, is an example of one method of providing a telephone or related system, with the ability to recognize the acceptance of a call or a collect call and attendant charges when the called party uses a pulse dialing telephone to indicate such acceptance in the form of a decadic dialed digit.

The algorithm of FIGS. 4 and 4A provides methods of recognizing decadic dialed digits for the purpose of responding to questions of the sort: "If you wish to accept this call [or "... charges for this collect call..."] please dial a ZERO now" such that called parties without access to Touch Tone (DTMF) telephones may have access to calls originating from telephone systems incorporating appropriate portions of the present invention. A window of about 1.2 seconds is appropriate if the requested digit is a "zero" to cover the time from the first detected pulse through the last pulse which may be the called party unmuting switch. As some pulses may be missed on some long-distance calls, accepting eight pulses as sufficient is usually practical in the case of a requested "zero."

Where call acceptance is the primary purpose of the decadic digit detector, the algorithm of FIGS. 4 and 4A also provides an additional method of detecting three-way call attempts.

The telephone company (Telco) Local Loop Current Test Algorithm, disclosed in FIG. 5, is an example of one method of detecting and responding to the loss of the telephone company loop current that often occurs when the calling party equipment and called party equipment share a common central office.

The 3-Way Call Handler, disclosed in FIG. 6, provides an example of some methods of dealing with an attempt by the called party to provide the calling party with three-way call access to a third party when this activity is prohibited by the institution or circumstances involved with the specific call in question.

Figure 7A:
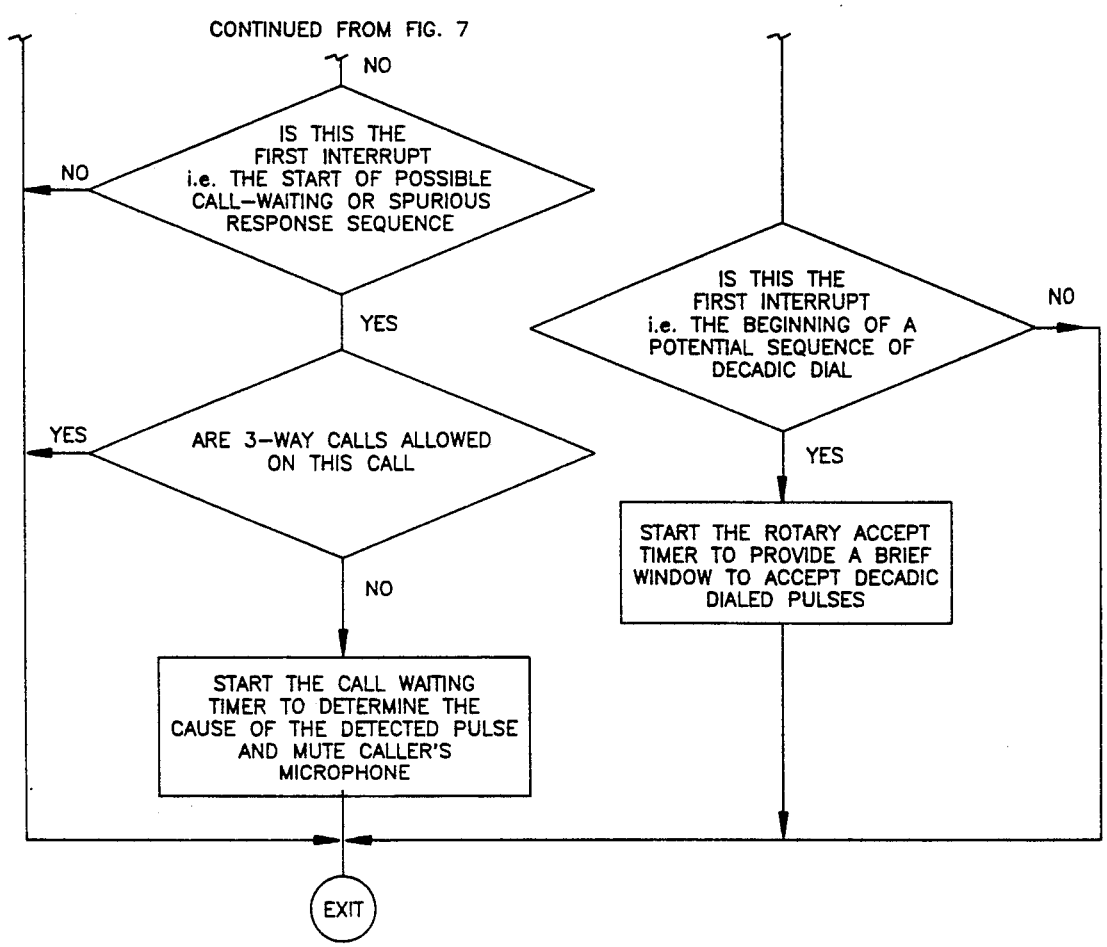

The Detected Pulse Handler, disclosed in FIGS. 7 and 7A, provides a means of communicating the detection of a pulse by Block 450, to the al of FIGS. 2–6 and 8,9. The algorithm of FIGS. 7 and 7A are presented in the form of a hardware interrupt response by the controlling program in Block 800.

The algorithm of FIG. 7 provides the function of restricting multiple responses to original signals that were of a singular nature (referred to as debouncing of signal 472). Further, the algorithm of FIGS. 7 and 7A provides the function of counting the debounced pulses detected by Block 450. Further, the algorithm of FIGS. 7 and 7A provides the function of starting a sequence of protective measures in an attempt to classify a detected pulse.

Figure 8:
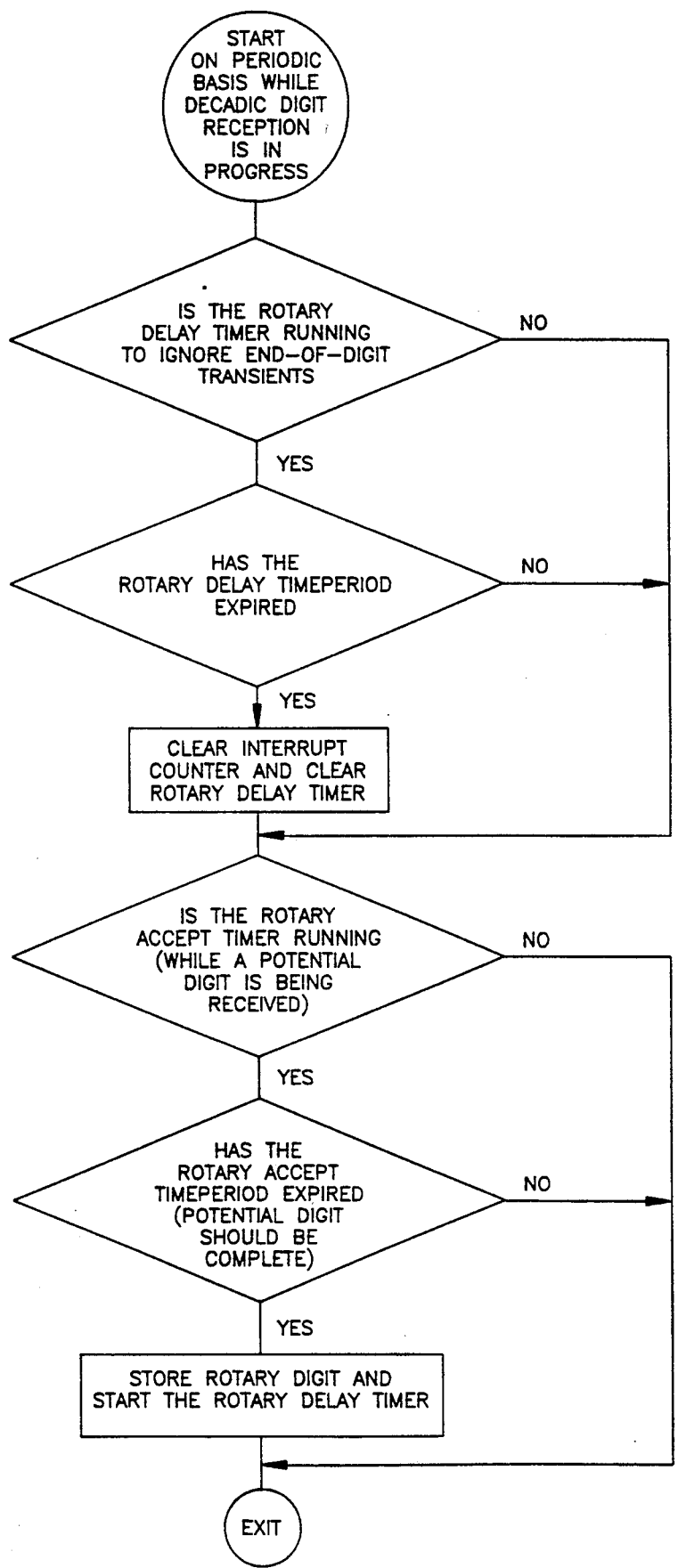
FIG. 8 is a software flow diagram of the present invention for recognizing decadic digits dialed from a rotary/pulse.

The Decadic Digit Detection Algorithm, disclosed in FIG. 8, is an example of one method of providing a telephone, or related system, with the ability to recognize the existence of a decadic dialed digit from a pulse dial telephone.

The algorithm of FIG. 8 provides a method of recognizing decadic dialed digits so that equipment, such as messaging systems incorporating appropriate portions of the present invention, may be accessed by pulse dialing telephone users which were previously accessible only to Touch Tone (DTMF) dialing telephone users.

Figure 9:
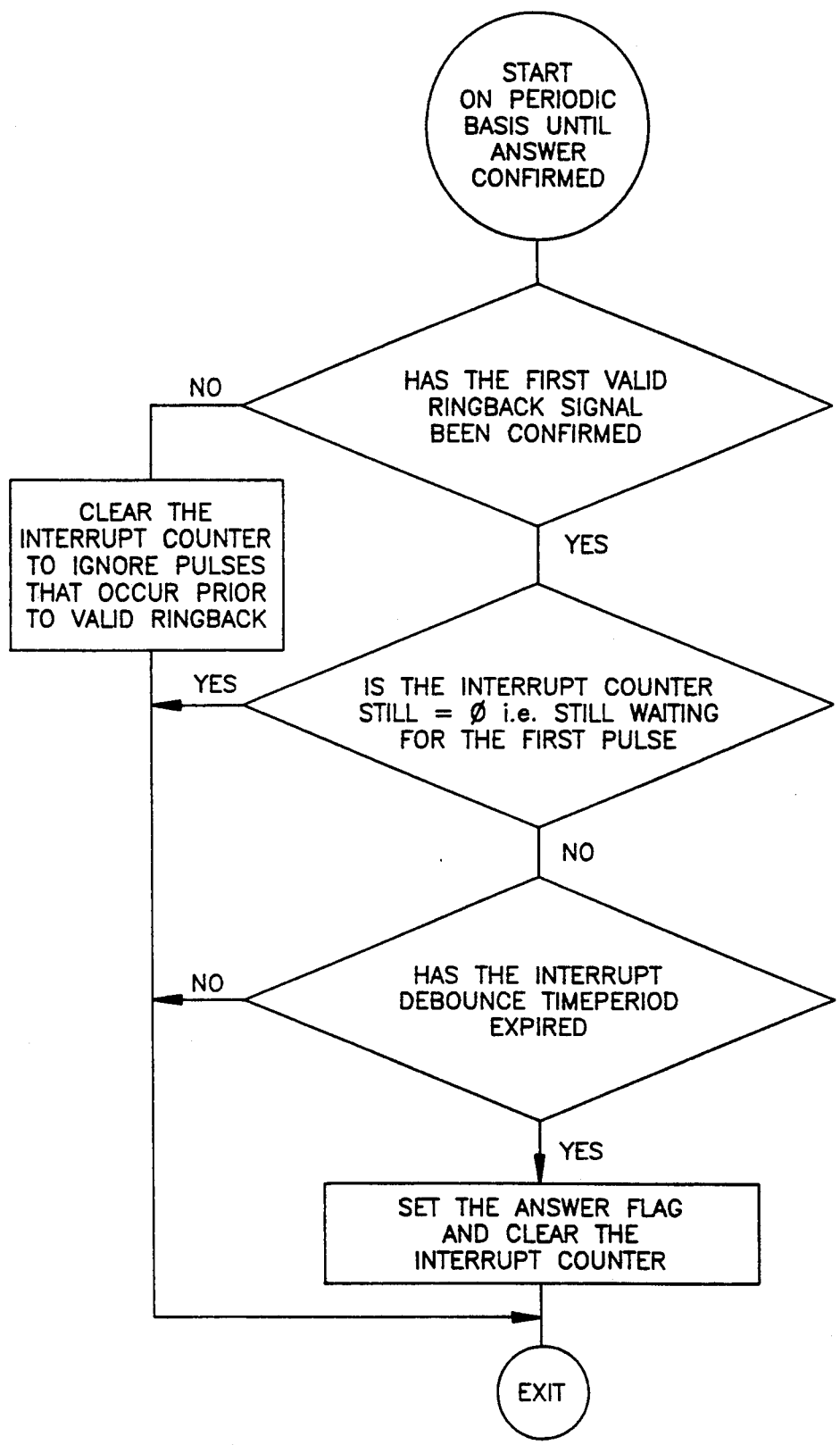
FIG. 9 is a software flow diagram of the present invention for detecting called party answer.

The Pulse Assisted Answer Supervision Algorithm, disclosed in FIG. 9, is an example of one method of providing a telephone, or related system, with the ability to recognize the moment, i.e. exactly when the called party answers their telephone. This is important on many computerized or otherwise automated telephone systems where the duration of the call is used to determine charges for the call or where automated voice systems communicate with the called party.

By following the flowcharts in FIGS. 2–9, for each of the conditions mentioned previously, the reader will understand how the apparatus of the present invention determines the cause of and response to one or more signals on lines 120 and 472, indicating for example, call answer, decadic (rotary/pulse) dial detection, call acceptance and the detection of and optional response to a detected (potentially fraudulent) three-way conference call.

SYSTEM SCHEMATIC DIAGRAMS

Figure 10:
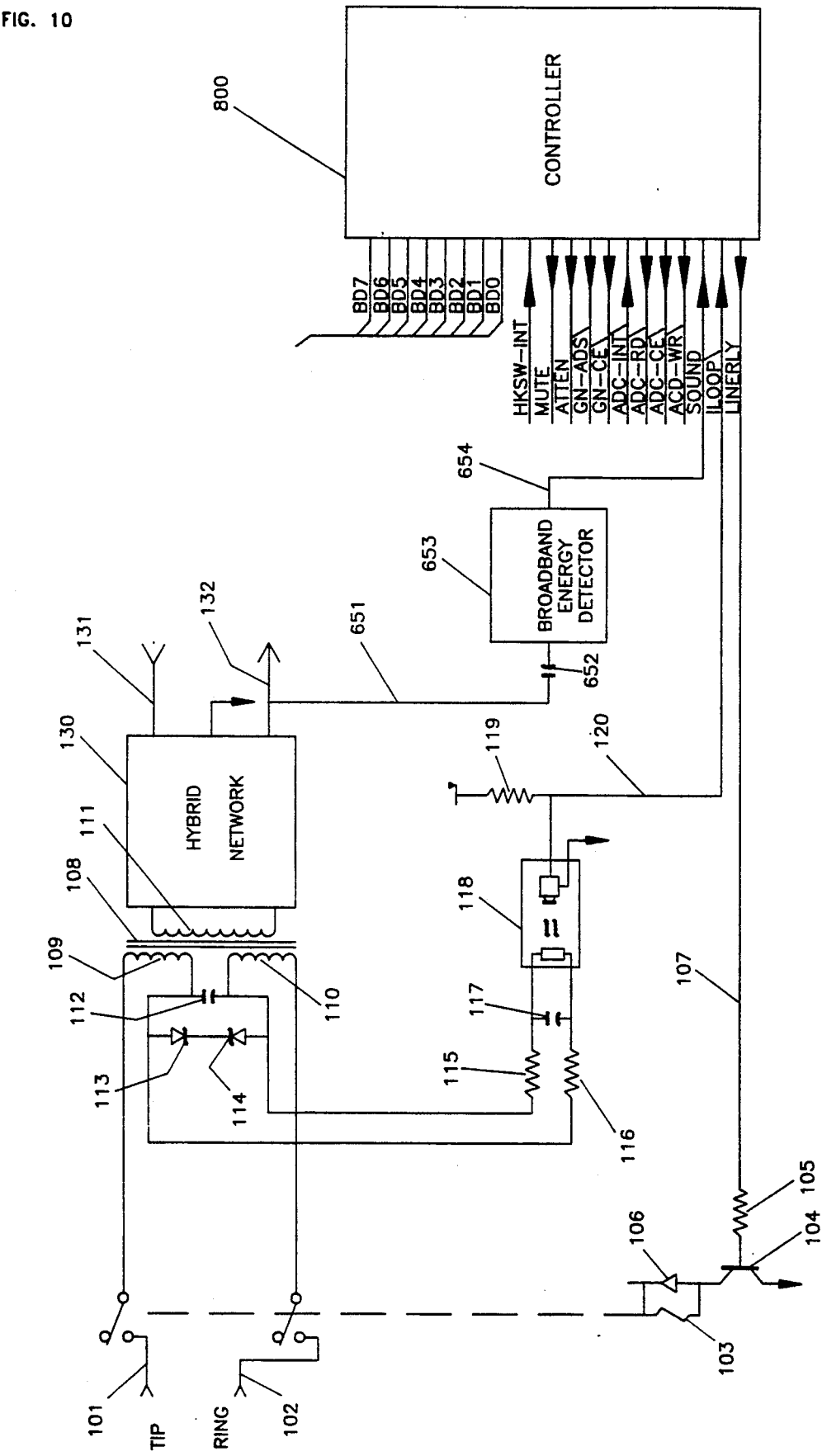
FIG. 10 is a detailed schematic diagram of a telephone company interface circuit for providing loop current detection in accordance with the invention.

FIG. 10 discloses a detailed implementation of a telephone loop current detector, Block 100; a Hybrid Network, Block 130; a Broadband Energy Detector, Block 653; and the interconnection of the above and associated circuits.

The telephone company wires, or the PSN are represented by lines 101, 102, commonly referred to as Tip and Ring. Relay 103 is used to connected the present telephone set or control module implementation to the PSN. Relay 103 may be any suitable mechanical or electronic device. In this instance, relay 103 is presented as an electromechanical relay driven by components 104, 105, & 106 for clarity. Relay 103 is functionally responsive to control wire 107 from the controller, Block 800.

Transformer 108 is provided to isolate the telephone functional implementation from the PSN. The illustrated balanced primary connection method is not required and a single primary transformer is completely adequate for the present invention. A transformerless hybrid function is also adequate. In the present instance, the common balanced primary connection is presented wherein the telephone company (primary) side of the transformer is shown as windings 109, 110 while the instrument (secondary) side of the transformer is shown as winding 111. Capacitor 112 is required in this case so that windings 109, 110 act as a continuous winding for the audio signals.

Zener diodes 113, 114 are provided so that the DC voltage across the Tip and Ring terminals and the DC loop current will be within telephone company limits. Whenever loop current is flowing in wires 101, 102 there is a voltage across the back-to-back zener diodes 113, 114. This voltage may be detected by use of an optoisolator 118 along with current limiting resistors 115, and 116. Capacitor 117 is used to provide a small amount of transient noise filtering. An optoisolator with parallel reverse connected emitters is presented as a minimum component implementation but any suitable detector circuit is adequate. Resistor 119 provides a bias voltage to the controller whenever loop current is not flowing. When loop current is flowing in wires 101, 102, the voltage across zener diodes 113, 114 will forward bias one of the optoisolator emitters, thereby activating the transistor or equivalent detector clamping signal 120 to the active state. An advantage of the loop current detector implementation just described is the ability to use an optoisolator with emitter current ratings commonly available for logic circuit use as the emitters are not required to carry the entire Telco Loop current.

Hybrid Network 130 provides 2-wire to 4-wire conversion between signals on transformer winding 111, which carries both transmitted and received signals, and wire 131, the transmit-only signal line, and wire 132, the receive-only signal line. For the purposes of this figure, it is assumed that signals 131 and 132 are analog implementations, although this need not be the case.

The Broadband Energy Detector for detecting sound, i.e., Block 653, is provided with the composite received signal available on line 651. Where necessary, capacitor 652 provides the DC voltage blocking function. This detector provides an indication on line 654 when audio energy, in the frequency range of about 300 to 750 Hz and of a level of −35 dBm or greater is present on line 651. Discrete and monolithic implementations of this function are readily available commercially as previously mentioned.

The controller, Block 800, is provided with signals indicating the presence of PSN loop current, signal 120, and audible sound energy, signal 654. In turn, the controller, Block 800 has been provided with means to connect to or disconnect from the PSN.

Figure 11:
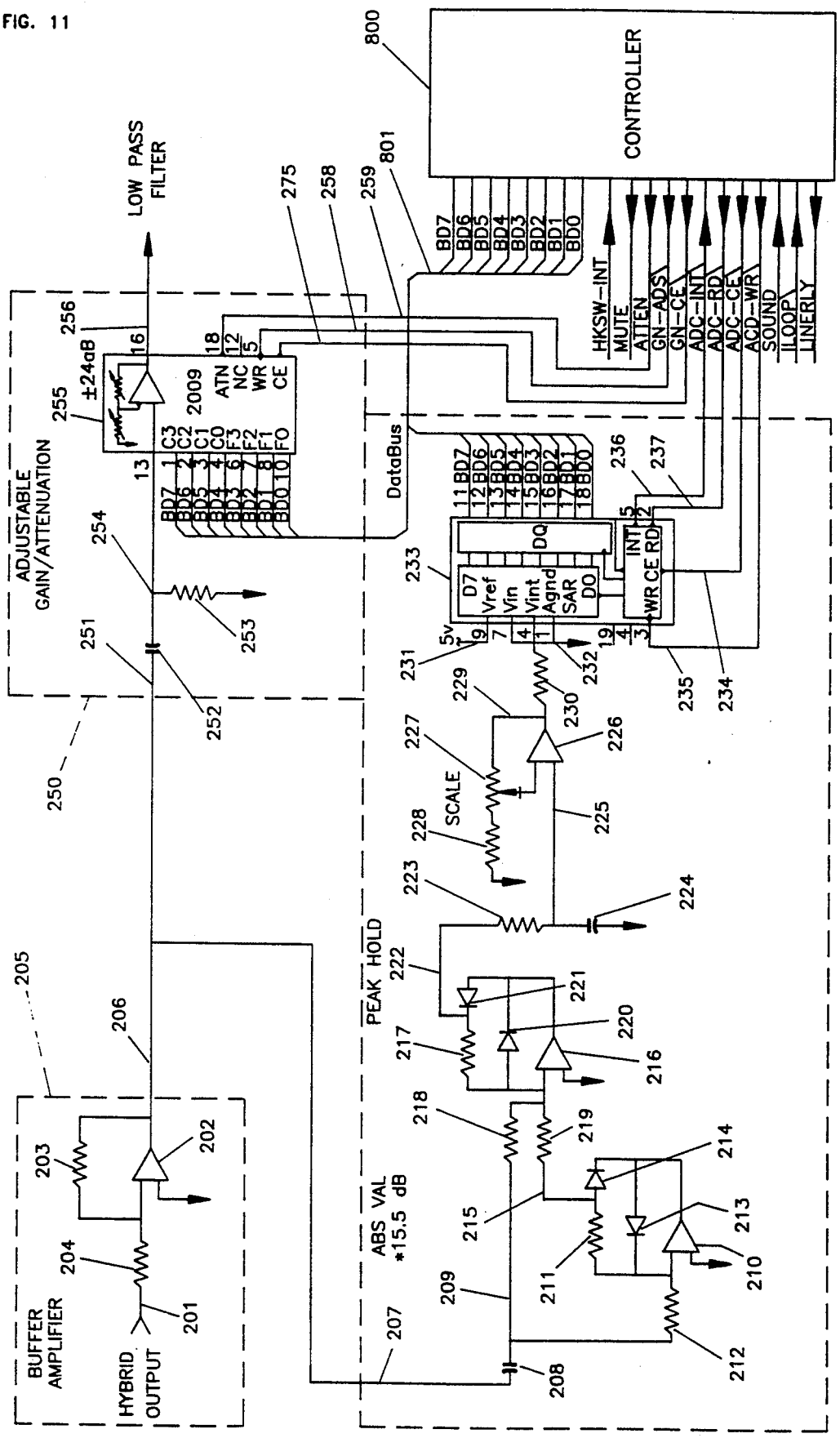
FIG. 11 is a detailed schematic diagram of an optional signal normalization system for use with the present invention.

FIG. 11 discloses a detailed implementation of an audio level meter, Block 200, along with an adjustable gain amplifier, Block 250, both of which are adequate for the present invention.

It is the responsibility of the telephone companies and carriers to provide adequate compensating amplification to voice frequencies to insure quality of service regardless of distance between the communicating parties. However, the signals indicative of hookflash or rotary dial induced loop current interruptions are somewhat below normal voice frequencies and in general are somewhat attenuated by the PSN as the path length increases. Fortunately for the purposes of the present invention, the ringback signal generated by the called party's Central Office is somewhat related to the level of all other audio levels that occur during the ensuing conversation. More importantly, the level of the Ringback signal is somewhat indicative of the total path that the signal has taken from the called party's Central Office to the calling telephone instrument. The loss of critical signal energy can thus be estimated and compensated for by the herein described or a functionally similar circuit.

The ringback signal level will commonly be at a level of about −15 to −30 dBm on lines 101, 102. This signal will normally be amplified to a level useful to a level measuring circuit to follow.

A buffer amplifier, Block 205, is provided to preclude loading of signal 201 and to conveniently provide a voltage gain of about two or signal gain of about 6 dB. Buffering and amplifying are not required for the present invention but are useful in isolating circuit functions and setting the maximum signal level that will be presented to the Adjustable Gain/Attenuation circuit, Block 250.

Buffer amplifier, Block 205, is conventionally comprised of an operational amplifier 202 and associated resistances 203 and 204 where the resistance 203 is twice the resistance 204. Signal 206 is the buffered and amplified signal representing the original audio signal on lines 101, 102. Operational amplifier 202 may be an LM324A available from National Semiconductor Corporation of Santa Clara, Calif.

An Audio Level Meter, Block 200, is provided to measure the audio level of the Ringback signal while a call is being made. Signals at line 206 are still too low to be conveniently measured by conventional Analog to Digital Convertor (ADC) components. Further, it is convenient to use a unipolar ADC which requires positive voltage signals. ADC 233 may be an ADC0841 available from National Semiconductor Corporation, Santa Clara, Calif. Accordingly, a three section measuring circuit is provided to determine the level of the ringback signal. The circuit comprises an absolute-value, or voltage rectification, circuit with gain and peak-hold (integrator) capability, a scaling or calibration function, and a monolithic ADC. The absolute value function is provided by operational amplifiers 216 and 226 along with associated resistances 211, 212, 217, 218, and 219 along with diodes 213, 214, 220, and 221. The resistance 217 is presented as six times the resistance 218 and twelve times the resistances 211, 212, and 219. This results in a gain of six in the Absolute Value Circuit as well as signal rectification. The combined signal amplification from lines 101, 102 due to the buffer amplifier 201 and the absolute value circuit is about 21.5 Db or a voltage gain of about 12. Ringback signals of −15 dBm level will have a voltage of about 400 millivolts peak-to-peak at lines 101, 102. This results in a peak voltage at line 222 of about 2.3 volts. This voltage peak is applied to the RC integrator circuit comprised of resistance 223 and capacitor 224. Capacitor 224 is charged by amplifier 216 through diode 221 and resistance 223 whenever the voltage at 222 is greater than the voltage at line 225. Capacitor 224 will be slowly discharged through resistances 217 and 223 whenever the voltage at 222 is less than the voltage at line 225. Thus, the voltage at line 225 is an amplified and integrated absolute valve of the representation of the absolute value of the recent peak signal level on line 101, 102.

For the purposes of the present invention it is desirable to have the signal level representing −15 Dbm correspond approximately to somewhat less than the full scale reading of the Audio Level Meter ADC component. The ADC component 233 shown with associated biasing connections 231, 232 provides for a full scale input voltage of 5.0 Vdc. Operational amplifier 226 and associated components 227, 228 conveniently provide a non-inverting amplifier with an adjustable gain. Thus, the overall voltage gain from line 101, 102 to line 229 may be about 24 or about 27.6 Db. Resistance 230 is provided to limit current into the ADC 233 when voltages greater than the maximum allowable input voltage forward bias the input protection diodes internal to the ADC component 232.

Signal 234 is provided from the system controller, Block 800, whenever the ADC 233 is read or a conversion started. Signal 235 is provided from the system controller, Block 800, whenever a conversion is required. Signal 236 is provided by the ADC 233 when the conversion requested has been completed. Signal 237 is provided from the system controller, Block 800, to cause the ADC 233 to place the result from the requested conversion onto the data bus 801.

Hookflash and rotary dial loop current interruptions at the called party telephone result in voltage excursions of about 55-60 volts, at the called party telephone, each time the loop current is broken. This is due to the inductive effects of the telephone company lines. Central Office equipment detects the current interruptions directly and attenuate the voltage excursions as undesirable noise. This voltage excursion, along with the characteristic impedance of the telephone company lines, results in a characteristic damped oscillation with peak energy between 200 and 300 Hz. The peak voltage seen at the originating telephone is significantly less. In order to facilitate repeatable detection of this damped oscillation, it is desirable to have peak voltage excursions of these damped oscillations at a consistent level on all calls.

Adjustable Gain/Attenuation circuit, Block 250, is provided for the purpose of compensating for the losses in the PSN, especially in long distance calls, and to boost the anticipated damped oscillation caused by hookflash or pulse dialing to the maximum level that can be handled by the required filter. In the present embodiment, the desired peak voltage is about three volts. Peak voltages of less than three volts will be undistorted by the following Low Pass Filter, Block 400, as implemented. Conveniently, three volts peak is also the maximum undistorted output signal from the Adjustable Gain/Attenuation component 255, which may be an ML2009 available from Micro Linear Corporation of San Jose, Calif.

It is to be understood that other circuits and components may be used to provide essentially the same function. Signal 257 is provided from the system controller, Block 800, whenever the gain or attenuation of component 255 is to be changed. Likewise, signal 258 is provided from the system controller, Block 800, whenever the gain or attenuation of component 255 is to be changed. When signals 257, 258 are appropriately asserted, component 255 latches the signals on the data bus 801 and the gain/attenuate signal 259. Assuming the hybrid network, Block 130, to have a net gain of 0 dB, the resulting overall gain or attenuation of signals on line 101, 102 to line 256 is the combination of the buffer amplifier, Block 205, and the setting of component 255 which results in a range of possible settings of −18 to +30 dB.

Figure 12:
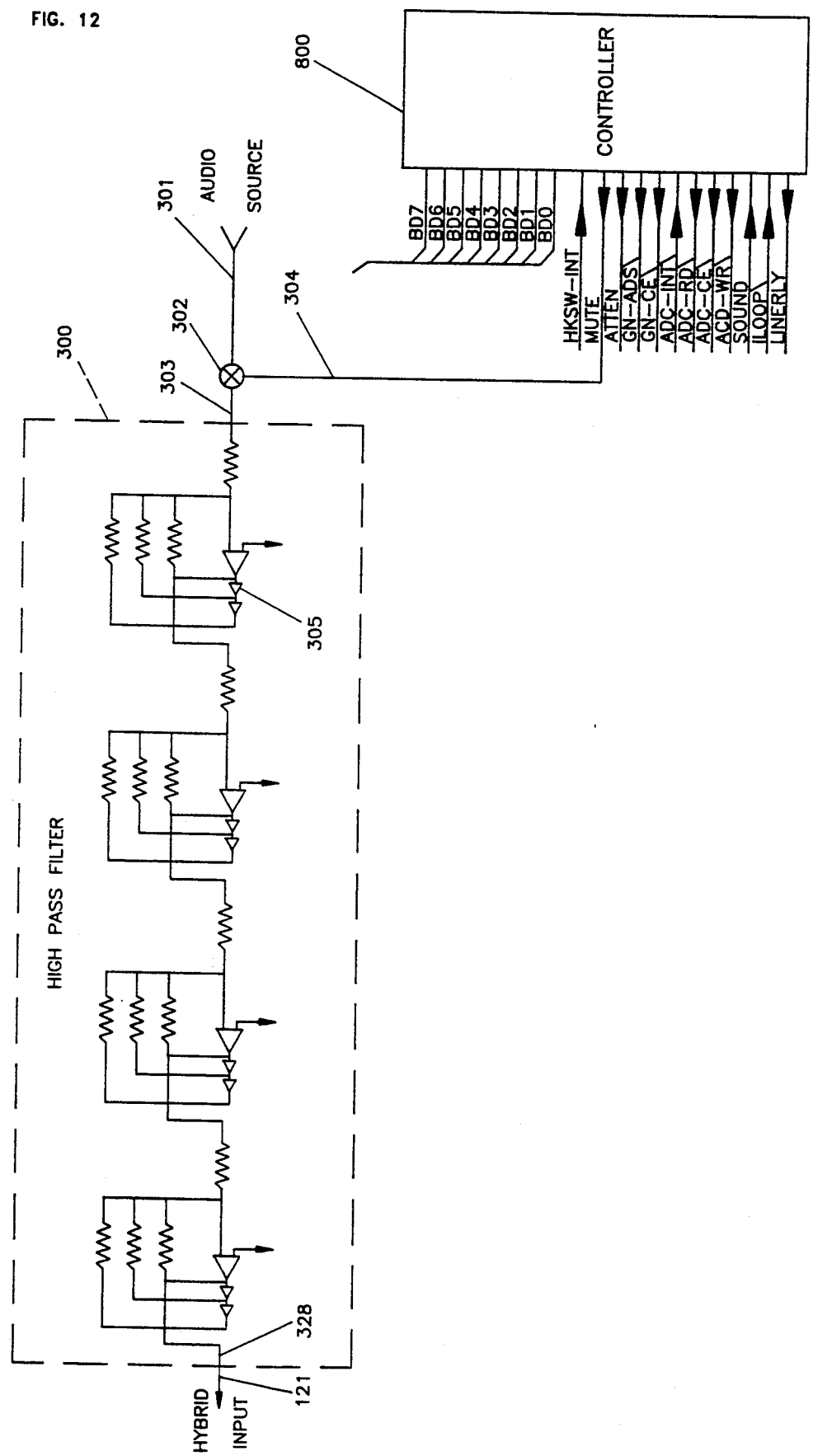
FIG. 12 is a detailed schematic diagram of a high pass filter for use with the present invention.

FIG. 12 discloses a switched capacitor filter implementation of the High Pass Filter, Block 300.

It is desirable to reduce the possibility of tripping the output of the Threshold Level Detector, Block 450, by signals originating within the telephone set itself. As the Low Pass Filter, Block 400, passes signals with energy below about 300 Hz, it is advantageous to limit signal energy being transmitted by the telephone to frequencies above about 300 Hz.

For this purpose a High Pass Filter, Block 300, is provided. All audio signals, most notably the users voice, are combined as required by the specific implementation prior to audio switch 302 and indicated as signal 301. Audio switch is useful to momentarily stop the transmission of all sounds when a potential rotary pulse dial sequence is expected or a potential hookflash has been detected. Audio switch 302 may be implemented in hardware as shown or in software in digital telephone implementation. Audio switch 302 is under the control of the controller, Block 800, and the control signal is indicated by signal line 304. An example audio switch is a 74HCT4316 available from NSC, etc.

The High Pass Filter, Block 300, is a compromise of several conflicting requirements. It is desirable to pass as much of the telephone users voice energy as possible, much of which can be in the 200 to 500 Hz range. The system requirement to stop all frequencies below 300 Hz means that the filter should be as sharp as possible at cutoff. In order to minimize user voice distortion, the pass band above 300 Hz should be quite flat and frequencies near the cutoff point should not oscillate excessively. These requirements can be reasonably met by a Chebychev type filter response. It is herein suggested that a High Pass Filter, with a corner frequency of about 320 Hz, attenuation of 20 dB or more at 290 Hz, and pass band ripple of 1.5 dB or less is readily implemented and is sufficient for this application. Such a filter is presented in the Figure implemented using an eighth order switched capacitor filter. A particularly useful switched capacitor filter component is the Linear Technology LTC1164 available from Linear Technology Corporation, Milpitas, Calif. The high pass filtered output signal is connected directly to the active hybrid networks input terminal, line 131.

Figure 13:
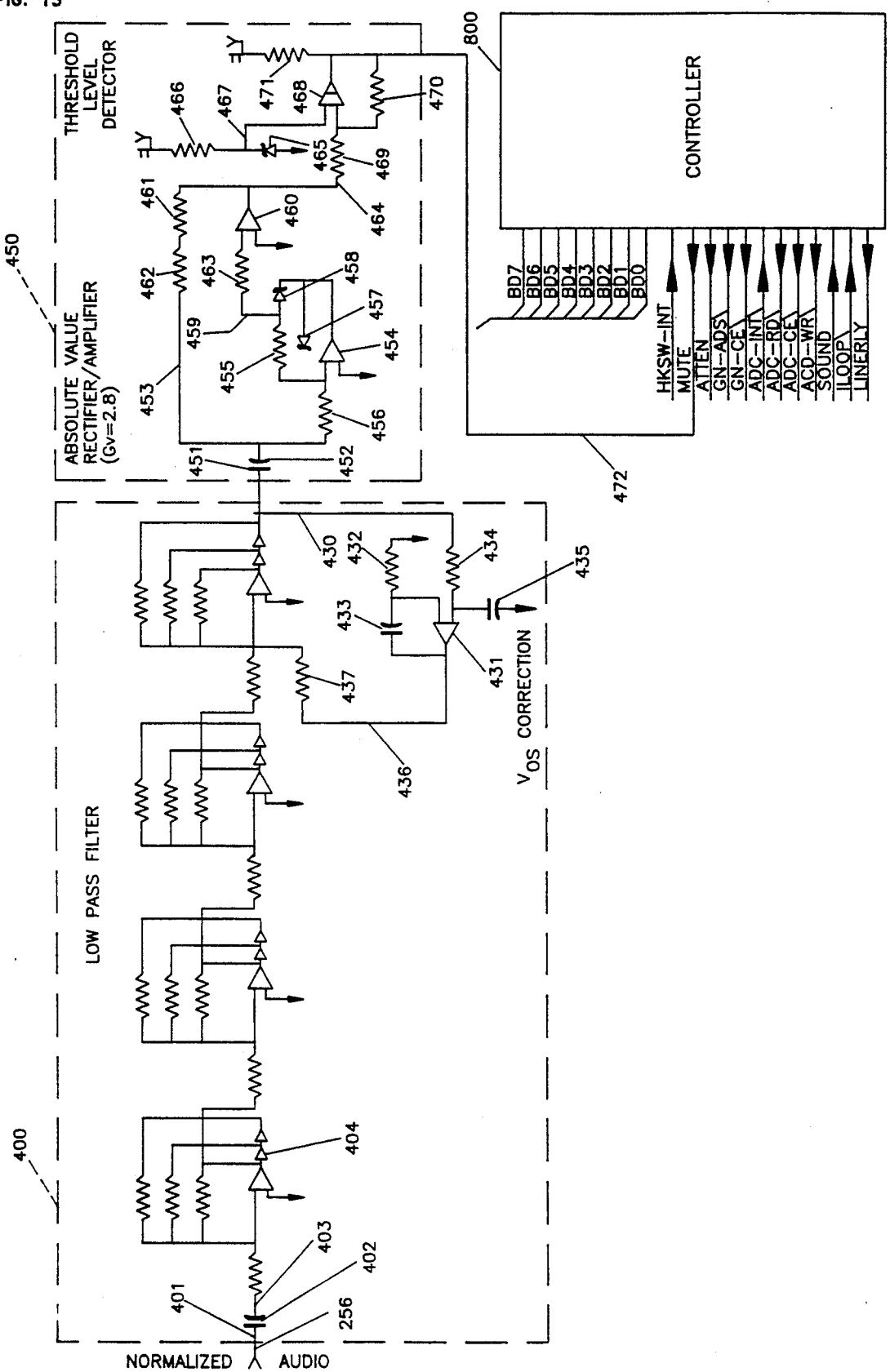
FIG. 13 is a detailed schematic diagram of a low pass filter and signal threshold detector for use with the present invention.

FIG. 13 discloses a switched capacitor filter implementation of the Low Pass Filter, Block 400, Absolute Value Amplifier and Threshold Level Detector, Block 450.

The signal created at the called party's telephone each time its loop current is interrupted has several unique characteristics. There is an energy peak at about 270 Hz. Since the called party's telephone is effectively disconnected from the circuit momentarily, no sounds from the called party's telephone will be added to this characteristic sound. There may well be an additional similar sound, perhaps of somewhat lower intensity, when the loop current is restored, either with each rotary dial pulse, or with a return hookflash.

The Low Pass Filter, Block 400, should pass as little user voice energy as possible in order to preclude false triggering by the Threshold Level Detector. However, the greatest identifiable signal energy is very near normal voice frequencies. Thus, the filter requirements are to reject as much energy as possible above about 300 Hz, and have reasonably undistorted response below about 300 Hz. These requirements can be reasonably met by a Chebychev type filter response. It is herein suggested that a Low Pass Filter with a corner frequency of about 280 Hz, attenuation of 20 dB or more at 300 Hz, and pass band ripple of 3.0 dB or less is readily implemented and is sufficient for this application. Such a filter is presented in FIG. 12 as implemented using an eighth order switched capacitor filter.

The input signal to the presented Low Pass Filter is provided by the output of the Adjustable Gain/Attenuation Amplifier, Block 250, as signal 256. This signal is expected to be normalized by the system controller based upon the ringback signal level. Note that this normalization is optional. Its purpose is only to improve detection of hookflash and rotary dial signals on quiet, typically long distance, calls. The output of the Low Pass Filter is available as signal 430.

A common characteristic of low pass filters of the type suggested is an objectionable output offset voltage. Components 431 through 437 typically reduce this offset voltage to a few millivolts. This provides the maximum dynamic range for the desired output signal at line 430.

As the Low Pass Filter output signal 430 is bipolar in nature and the peak signal level is limited by the capabilities of the specific filter implementation, it is desirable to both rectify and amplify the Low Pass Filter output before presenting the signal to a Threshold Level Detector. A specific switched capacitor filter chip used by the inventor had an undistorted output voltage swing of ±3 volts. After rectification this signal would still be +3 volts. In order to reduce the required accuracy of the Threshold Detector as much as possible, the rectifier circuit includes a voltage gain of about 2.8 yielding a peak undistorted signal of about +8.4 volts. Unusually loud signals will still pass through the filter with acceptable distortion but probably will not cause signal 464 to exceed 12 volts, the suggested supply bias for comparator 468. It should be noted that the value of resistance 461 is 2.8 times that of resistance 462 and 5.6 times that of resistances 455, 462, and 463 resulting in the desired gain within the absolute value circuit. It should be further noted that this gain is not required, only useful. The output signal of the Rectifier/Amplifier, Block 450, is available as signal 464.

The nature of the system response to called party speech, called party rotary dialing or hook switch flashing is such that normal speech will seldom pass through the Low Pass Filter, Block 400. However, some components of normal speech can cause momentary signal excursions at signal 464. Such excursions will most often be of a few hundred millivolts or less. Called party rotary dialed digits or hookflash induced signals will normally cause excursions of at least a few volts at signal 464. The strongest signals will normally be caused by the loop current interruption at the called party telephone with somewhat weaker signals being generated by the reestablishment of current at the end of each rotary dial pulse or the reconnect hookflash. It is therefor useful to set a known threshold below which small signal excursions, probably speech caused, will be ignored. To accomplish this, the Threshold Level Detector portion of block 450 is provided. The Threshold Level Detector is implemented using a readily available comparator 468 along with associated resistances 469, 470 and 471 which interact to provide a controlled amount of hysteresis about the selected Threshold level 467 set by the reference voltage indicated by zener diode 465 and resistance 466. Other methods of setting the threshold level are completely adequate. The output signal 472 could be used to interrupt the system controller, Block 800, at each occurrence of signal energy sufficient to trip the Threshold Level Detector. Comparator 468 may be an LM393 and the voltage reference diode may be an LM385-1.2, both of which are available from NSC.

The invention has been described in detail with reference to particular embodiments thereof, but it will be understood that various other modifications can be effected within the spirit and scope of this invention.

We claim:

1. An apparatus for use in conjunction with a local telephone equipment in telecommunication with a remote telephone, wherein said remote telephone has a three-way calling service which is not associated with the apparatus, to indicate whether a remote party using the remote telephone has performed a specific act that is consistent with an attempt to initiate a three-way call causing the generation of a hook flash signal, said apparatus comprising:
   low pass filter means for passing energy received by the local telephone equipment having frequencies below about 500 Hz;
   energy detection means for detecting a specific electrical energy pulse having been filtered by said filter means and having a predetermined minimum magnitude;
   window analyzation means for cooperating with said energy detection means to detect a specific event(s) occurring during a predetermined maximum time window following the detection of a specific pulse occurring during a telephone call in progress between a local party and a remote party, the detection of the specific event(s) providing an indication as to whether the remote party has performed a specific act that is consistent with an attempt to initiate a three-way call;
   said window analyzation means including
      timer means for cooperating with said energy detection means so that said timer means begins running for a first predetermined time period when a specific energy pulse is detected and
      sound detection means for detecting sound during the telecommunication and for cooperating with said timer means so that said sound detection means is activated at the end of the first predetermined period for a second predetermined maximum time period; and
      handling means for implementing a predetermined response if sound is undetected during the second predetermined period, the undetection of which provides an indication that the remote party has performed a specific act that is consistent with an attempt to initiate a three-way call.

2. An apparatus as claimed in claim 1 wherein said handling means includes means for terminating the telecommunication between the local and remote parties if sound is undetected during the second predetermined period.

3. An apparatus as claimed in claim 1 wherein said handling means includes means for playing a prerecorded message if sound is undetected during the second predetermined period.

4. An apparatus as claimed in claim 1 wherein said handling means includes means for generating a tone which is heard by one or more parties to the telecommunication if sound is undetected during the second predetermined period.

5. An apparatus as claimed in claim 1 wherein said handling means includes muting the local telephone equipment.

6. An apparatus as claimed in claim 1 wherein said handling means includes recording the data and time of the undetection of sound during the second predetermined period.

7. A method for indicating whether a remote party using a remote telephone in telecommunication with a local telephone/equipment, wherein said remote telephone has a three-way calling service which is not associated with the local telephone/equipment, has performed a specific act that is consistent with an attempt to initiate a three-way call causing the generation of a hook flash signal, said method comprising:
   filtering energy received by the local telephone equipment to pass energy having frequencies below about 500 Hz;
   detecting a filtered specific electrical energy pulse having a predetermined minimum magnitude;
   detecting a specific event(s) occurring during a predetermined maximum time window following the detection of the specific pulse, which pulse occurs during a telephone call in progress between a local party at said local telephone equipment and said remote party; said detecting a specific event(s) including
   running a timer means for a first predetermined time period when the specific energy pulse is detected; and
   monitoring the telecommunication for a second predetermined maximum time period which commences at the end of the first predetermined time period for the purpose of detecting sound, the detection of which indicates that a three-way call has not been attempted whereas the failure to detect sound indicates that the remote party has performed a specific act that is consistent with an attempt to initiate a three-way call; and
   responding to the detection of the specific event(s).

8. A method as claimed in claim 7 wherein the step of responding to an indicated three-way conference call attempt includes terminating the call between the local and remote parties.

9. A method as claimed in claim 7 wherein the step of responding to an indicated three-way conference calling attempt includes playing a prerecorded message.

10. A method as claimed in claim 7 wherein the step of responding to an indicated three-way conference calling attempt includes generating a tone which is heard by one or more parties to the call.

11. A method as claimed in claim 7 wherein the step of responding to an indicated three-way conference calling attempt includes muting the local telephone equipment.

12. A method as claimed in claim 7 wherein the step of responding to an indicated three-way conference calling attempt includes recording the data and time of the remote party's specific act that is consistent with an attempt to initiate a three-way conference call.

13. A method as claimed in claim 7 further comprising preventing signals originating at the local telephone equipment from interfering with signals originating at the remote party's telephone.

14. A method as claimed in claim 13 wherein the step of preventing signals originating at the local telephone equipment from interfering with signals originating at the remote party's telephone includes muting of the local telephone equipment when the specific pulse is detected.

15. A method as claimed in claim 7 comprising the additional step of preventing signals originating at the local telephone equipment from interfering with signals originating at the remote party's telephone by muting of the local telephone equipment when the specific pulse is detected.

16. An apparatus for use in conjunction with a local telephone equipment in telecommunication with a remote telephone, wherein said remote telephone has a three-way calling service which is not associated with the apparatus, to indicate whether a remote party using the remote telephone has performed a specific act that is consistent with an attempt to initiate a three-way call causing the generation of a hook flash signal, said apparatus comprising:
   low pass filter means for passing energy received by the local telephone equipment having frequencies below about 500 Hz;
   energy detection means for detecting a specific electrical energy pulse having been filtered by said filter means and having a predetermined minimum magnitude;
   window analyzation means for cooperating with said energy detection means to detect a specific event(s) occurring during a predetermined maximum time window following the detection of the specific pulse occurring during the telecommunication between a local party at said local telephone equipment and the remote party, the detection of the specific event(s) providing an indication as to whether the remote party has performed a specific act that is consistent with an attempt to initiate a three-way call; and
   normalization means for normalizing the level of electrical energy to be presented to said energy detection means so that the energy level of long distance calls has approximately the same magnitude as that of local calls;
   said normalization means including:
      ringback level detection means for detecting the level of the remote party telephone's ringback energy; and
      adjustable gain means for amplifying or attenuating the ringback energy level by a factor related to the detected remote party ringback energy level so that the electrical energy of long distance calls to be presented to said energy detection means has approximately the same magnitude as that of local calls.

17. An apparatus as claimed in claim 16 wherein said adjustable gain means amplifies or attenuates the ringback energy level so that it is normalized to about 400 millivolts peak.

18. An apparatus for use in connection with a limited access telephone in telecommunication with a called party, wherein the called party's telephone has a three-way calling service which is not associated with the apparatus to detect and respond to the called party's performance of a specific act that is consistent with an attempt to initiate a three-way conference call, said apparatus comprising;
   interference prevention means for preventing signals originating at the limited access telephone from interfering with signals originating at the called party's telephone;

low pass filter means for passing energy having frequencies below about 500 Hz;

energy detection means for detecting a specific electrical energy pulse having been filtered by said filter means and having a predetermined minimum magnitude;

timer means for cooperating with said detection means so that said timer means begins running for a first predetermined period of time when the specific pulse is detected;

sound detection means for detecting sound during the telecommunication and for cooperating with said timer means so that said sound detection means is activated at the end of the first predetermined period for a second predetermined maximum period of time; and conference calling handling means for implementing a predetermined response if sound is undetected by said sound detecting means during the second predetermined period.

19. A method for indicating whether a remote party using a remote telephone, wherein said remote telephone has a three-way calling service which is not associated with the apparatus, in telecommunication with a local telephone equipment has performed a specific act that is consistent with an attempt to initiate a three-way call causing the generation of a hook flash signal, said method comprising:

filtering energy received by the local telephone equipment to pass energy having frequencies below about 500 Hz;

detecting a filtered specific electrical energy pulse having a predetermined minimum magnitude;

detecting a specific event(s) occurring during a predetermined maximum time window following the detection of a specific pulse, which pulse occurs during a telephone call in progress between a local party at said local telephone equipment and the remote party;

normalizing the level of electrical energy to be presented to the energy detecting means so that the energy level of a long distance call has approximately the same magnitude as that of local calls; said normalizing comprising;

detecting the level of the remote party telephone's ringback energy; and amplifying or attenuating the ringback energy level by a factor related to the detected ringback energy level so that the electrical energy of long distance calls to be presented to the energy detection means has approximately the same magnitude as that of local calls.

20. An apparatus for use in conjunction with local telephone equipment in telecommunication with a remote telephone, wherein said remote telephone has a three-way calling service which is not associated with the apparatus, which apparatus is capable of determining whether a remote party using the remote telephone has performed a specific act that is consistent with an attempt to initiate a three-way call utilizing a hook-flash signal comprising:

means for the detection of an energy pulse received by the local telephone equipment having a frequency characteristic of the hook-flash signal; and response means for implementing a predetermined response when said energy pulse is detected.

21. The apparatus of claim 20 wherein the frequency to be detected is between 100 and 300 Hz.

22. The apparatus of claim 20 wherein the frequency to be detected is between 200 and 300 Hz.

23. The apparatus of claim 22 wherein the predetermined response is at least one member selected from the group consisting of:

termination of the telecommunication between the local telephone equipment and the remote telephone;

transmission of a prerecorded message;

generation of an audible tone to one or more of the parties to the telecommunication; and recording of the data and time of the remote party's performing an act that is consistent with an attempt to initiate the three-way call.

24. The apparatus of claim 23 wherein the predetermined response comprises the termination of the telecommunication between the local telephone equipment and the remote telephone.

25. The apparatus of claim 22 wherein the means for the detection of energy comprises:

filter means for the limitation of energy to a frequency range characteristic of the hook-flash signal; and an energy detector for detecting a specific electrical energy pulse having passed through the filter.

26. The apparatus of claim 25 wherein the energy detector detects the specific electrical energy pulse having passed through the filter means and having a predetermined minimum magnitude.

27. The apparatus of claim 25 wherein the predetermined response is at least one member selected from the group consisting of:

termination of the telecommunication between the local telephone equipment and the remote telephone;

transmission of a prerecorded message;

generation of an audible tone to one or more of the parties to the telecommunication; and recording of the date and time of the remote party's performing an act that is consistent with an attempt to initiate the three-way call.

28. The apparatus of claim 27 wherein the predetermined response comprises the termination of the telecommunication between the local telephone equipment and the remote telephone.

29. The apparatus of claim 28 also including means to prevent signals originating with the local telephone equipment from interfering with the energy detector's ability to detect energy characteristic of the hook-flash.

30. The apparatus of claim 22 which also comprises normalization means for normalizing the level of electrical energy to be presented to the energy detection means so that the energy level of long distance calls has approximately the same magnitude as that of local calls.

31. The apparatus of claim 30 wherein the normalization means comprises:

ringback level detection means for detecting the level of the remote party telephone's ringback energy; and adjustable gain means for amplifying or attenuating the ringback energy level by a factor related to the detected remote party ringback energy level so that the electrical energy of long distance calls to be presented to said energy detection means has approximately the same magnitude as that of local calls.

32. An apparatus for use in conjunction with local telephone equipment in telecommunication with a remote telephone, wherein said remote telephone has a three-way calling service which is not associated with the apparatus, which apparatus is capable of determining whether a remote party using the remote telephone has performed a specific act that is consistent with an attempt to initiate a three-way call utilizing a hook-flash signal comprising:

means for the detection of an energy pulse received by the local telephone equipment having a frequency characteristic of the hook-flash signal;

window analyzation means for cooperating with said energy detection means to detect a specific event(s) occurring during a predetermined time window following the detection of the energy pulse, the detection of the specific event(s) confirming whether the remote party has performed a specific act that is consistent with an attempt to initiate a three-way call; and response means for implementing a predetermined response when the remote party's performance of a specific act that is consistent with an attempt to initiate a three-way call has been confirmed.

33. The apparatus of claim 32 wherein the frequency to be detected is between 100 and 300 Hz.

34. The apparatus of claim 32 wherein the frequency to be detected is between 200 and 300 Hz.

35. The apparatus of claim 34 wherein the predetermined response is at least one member selected from the group consisting of:

termination of the telecommunication between the local telephone equipment and the remote telephone;

transmission of a prerecorded message;

generation of an audible tone to one or more of the parties to the telecommunication; and recording of the data and time of the remote party's performing an act consistent with an attempt to initiate the three-way call.

36. The apparatus of claim 35 wherein the predetermined response comprises the termination of the telecommunication between the local telephone equipment and the remote telephone.

37. The apparatus of claim 34 wherein the means for the detection of an energy pulse comprises:

filter means for the limitation of energy to a frequency range characteristic of the hook-flash signal; and an energy detector for detecting a specific electrical energy pulse having passed through the filter.

38. The apparatus of claim 37 wherein the energy detector detects the specific electrical energy pulse having passed through the filter and having a predetermined minimum magnitude.

39. The apparatus of claim 37 wherein the predetermined response is at least one member selected from the group consisting of:

termination of the telecommunication between the local telephone equipment and the remote telephone;

transmission of a prerecorded message;

generation of an audible tone to one or more of the parties to the telecommunication; and recording of the date and time of the remote party's performing a specific act consistent with an attempt to initiate the three-way call.

40. The apparatus of claim 39 wherein the predetermined response comprises the termination of the telecommunication between the local telephone equipment and the remote telephone.

41. The apparatus of claim 34 which also comprises means to prevent signals originating with the local telephone equipment from interfering with the energy detector's ability to detect an energy pulse characteristic of the hook-flash.

42. The apparatus of claim 41 wherein the means to prevent signal interference comprises echo cancellation means.

43. The apparatus of claim 41 wherein the means to prevent signal interference comprises:

muting means cooperating with said energy detection means for muting the local telephone equipment when the specific pulse is detected by said energy detection means; and unmuting means for unmuting the local telephone equipment at the conclusion of the predetermined window.

44. The apparatus of claim 34 which also comprises normalization means for normalizing the level of electrical energy to be presented to said energy detection means so that the energy level of long distance calls has approximately the same magnitude as that of local calls.

45. The apparatus of claim 44 wherein said normalization means includes:

ringback level detection means for detecting the level of the remote party telephone's ringback energy; and adjustable gain means for amplifying or attenuating the ringback energy level by a factor related to the detected remote party ringback energy level so that the electrical energy of long distance calls to be presented to said energy detection means has approximately the same magnitude as that of local calls.

46. The apparatus of claim 34 wherein said window analyzation means comprises:

timer means for cooperating with said energy detection means so that said timer means begins running for a first predetermined time period when a specific energy pulse is detected and sound detection means for detecting sound during the telecommunication and for cooperating with said timer means so that said sound detection means is activated at the end of the first predetermined period for a second predetermined maximum time period.

47. The apparatus of claim 32 wherein said energy detection means comprises a digital signal processor for implementing a frequency component determination using a Fast Fourier Transform technique from a periodically sampled series of signal energy during the telecommunication to determine if frequency components below a minimum frequency are of a minimum magnitude.

48. A method for determining whether a remote party using a remote telephone in telecommunication with local telephone equipment, wherein said remote telephone has a three-way calling service which is not associated with the apparatus, has performed a specific act that is consistent with an attempt to initiate a three-way call utilizing a hook-flash signal comprising:

detecting an energy pulse received by the local telephone equipment having a frequency characteristic of the hook-flash signal; and responding in a predetermined manner when said energy pulse is detected.

49. The method of claim 48 wherein the frequency to be detected is between 100 and 300 Hz.

50. The method of claim 48 wherein the frequency to be detected is between 200 and 300 Hz.

51. The method of claim 50 wherein the predetermined response is at least one member selected from the group consisting of:
 termination of the telecommunication between the local telephone equipment and the remote telephone;
 transmission of a prerecorded message;
 generation of an audible tone to one or more of the parties to the telecommunication; and
 recording of the date and time of the remote party's performing an act consistent with an attempt to initiate a three-way call.

52. The method of claim 51 wherein the predetermined response comprises the termination of the telecommunication between the local telephone equipment and the remote telephone.

53. The method of claim 48 further comprising:
 monitoring the telecommunication for a predetermined time period which commences after the detection of the energy pulse to detect a specific event(s) occurring during that time period the detection of which confirms whether the remote party has performed a specific act that is consistent with an attempt to initiate a three-way call and
 the responding in a predetermined manner occurs when the remote party's performance of a specific act that is consistent with an attempt to initiate a three-way call has been confirmed.

54. The method of claim 53 wherein the frequency to be detected is between 100 and 300 Hz.

55. The method of claim 53 wherein the frequency to be detected is between 200 and 300 Hz.

56. The method of claim 55 wherein the predetermined response is at least one member selected from the group consisting of:
 termination of the telecommunication between the local telephone equipment and the remote telephone;
 transmission of a prerecorded message;
 generation of an audible tone to one or more of the parties to the telecommunication; and
 recording of the date and time of the remote party's performing a specific act consistent with an attempt to initiate the three-way call.

57. The method of claim 56 wherein the predetermined response comprises the termination of the telecommunication between the local telephone equipment and the remote telephone.

58. The method of claim 56 wherein the step of detecting energy comprises:
 filtering the energy received by the local telephone equipment to a frequency range characteristic of the hook-flash signal; and
 detecting a specific electrical energy pulse having passed through the filter.

59. The method of claim 58 wherein the specific electrical energy pulse having passed through the filter has a predetermined minimum magnitude.

60. The method of claim 58 further comprising the step of preventing signals originating with the local telephone equipment from interfering with the detecting of an energy pulse characteristic of the hook-flash.

61. The method of claim 60 wherein the step of preventing signals from the local telephone equipment from interfering with the detecting of the energy pulse characteristic of the hook-flash is accomplished by echo cancellation.

62. The method of claim 60 wherein the step of preventing signals from the local telephone equipment from interfering with the detecting of energy characteristic of the hook-flash is accomplished by:
 muting the local telephone equipment when an energy pulse is detected; and
 unmuting the local telephone equipment at the conclusion of the predetermined window.

63. The method of claim 56 further comprising the step of normalizing the level of electrical energy to be presented to said energy detection means so that the energy level of long distance calls has approximately the same magnitude as that of local calls.

64. The method of claim 63 wherein the step of normalizing the level of electrical energy comprises:
 detecting the level of the remote party telephone's ringback energy; and
 adjusting by amplifying or attenuating the ringback energy level by a factor related to the detected remote party ringback energy level so that the electrical energy of long distance calls to be presented to said energy detection means has approximately the same magnitude as that of local calls.

* * * * *